United States Patent
Lee et al.

(10) Patent No.: US 10,803,363 B2
(45) Date of Patent: Oct. 13, 2020

(54) MEDIA INTELLIGENCE AUTOMATION SYSTEM

(71) Applicants: DomaniCom Corporation, Shelton, CT (US); Data-Core Systems, Inc., Philadelphia, PA (US)

(72) Inventors: Jeongkyu Lee, Shelton, CT (US); Sin-Min Chang, Shelton, CT (US); Indranil Sardar, Philadelphia, PA (US); Soumyajit Sen, Shelton, CT (US)

(73) Assignee: Data-Core Systems, Inc., Philadelphia, PA (US)

(*) Notice: Subject to any disclaimer, the term of this patent is extended or adjusted under 35 U.S.C. 154(b) by 219 days.

(21) Appl. No.: 16/000,828

(22) Filed: Jun. 5, 2018

(65) Prior Publication Data
US 2019/0065911 A1   Feb. 28, 2019

Related U.S. Application Data

(60) Provisional application No. 62/515,639, filed on Jun. 6, 2017.

(51) Int. Cl.
| | |
|---|---|
| *G06K 9/62* | (2006.01) |
| *G06K 9/46* | (2006.01) |
| *G06K 9/50* | (2006.01) |
| *G06N 3/08* | (2006.01) |
| *G06Q 30/02* | (2012.01) |
| *G06K 9/03* | (2006.01) |
| *G06N 5/02* | (2006.01) |
| *G06N 3/04* | (2006.01) |

(52) U.S. Cl.
CPC .......... *G06K 9/6284* (2013.01); *G06K 9/033* (2013.01); *G06K 9/46* (2013.01); *G06K 9/50* (2013.01); *G06K 9/627* (2013.01); *G06K 9/6292* (2013.01); *G06N 3/0427* (2013.01); *G06N 3/08* (2013.01); *G06N 5/025* (2013.01); *G06Q 30/0277* (2013.01); *G06K 2209/25* (2013.01)

(58) Field of Classification Search
CPC .................................. G06K 9/50; G06K 9/52
See application file for complete search history.

(56) References Cited

U.S. PATENT DOCUMENTS

| | | | |
|---|---|---|---|
| 8,301,996 B2* | 10/2012 | Ofek | G06Q 10/20 715/231 |
| 2002/0136449 A1* | 9/2002 | Park | G06K 9/3241 382/164 |

(Continued)

*Primary Examiner* — Dwayne D Bost
*Assistant Examiner* — Stephen M Brinich
(74) *Attorney, Agent, or Firm* — McDonnell Boehnen Hulbert & Berghoff LLP

(57) ABSTRACT

Systems and methods for analyzing, segmenting, and classifying multimedia material are disclosed herein. Embodiments include (i) receiving multimedia material for analysis, (ii) extracting elements from the multimedia material and forming objects comprising the elements; (iii) segmenting the multimedia material into segments, where individual segments include objects located within a threshold distance from each other; (iv) detecting objects within each segment; (v) associating attributes with the detected objects within the segments; (vi) annotating the segments by creating a relationship tree among the objects within each segment; and (vii) storing annotations of the segments for analysis.

20 Claims, 14 Drawing Sheets

(56) References Cited

U.S. PATENT DOCUMENTS

| | | | | |
|---|---|---|---|---|
| 2004/0189813 A1* | 9/2004 | Tanaka | ............... | H04N 1/2112 |
| | | | | 348/207.99 |
| 2010/0077001 A1* | 3/2010 | Vogel | ............... | G06F 16/353 |
| | | | | 707/777 |
| 2013/0046823 A1* | 2/2013 | Mitchell | ............. | G06Q 10/107 |
| | | | | 709/204 |

* cited by examiner

MEDIA INTELLIGENCE AUTOMATION SYSTEM

CROSS REFERENCE TO RELATED APPLICATIONS

This application claims priority to U.S. App. 62/515,639, titled "Media Intelligence Automation System" filed on Jun. 6, 2017. The entire contents of the 62/515,639 application are incorporated herein by reference.

OVERVIEW

This disclosure describes novel methods and systems for extracting, creating and organizing advertisement-related data and metadata from print, video, Internet and multimedia-based material. The resulting data and metadata can be processed for further analysis including trending of product evolution, pricing, branding, and sentiment analysis.

The elements of multimedia material analyzed via the disclosed systems and methods include text, image, audio, video, and animation. Text is the most common multimedia element. Text expresses the information the content creator is trying to convey to their viewers. In an advertisement, text and images are often interconnected because a combination of text and images expresses a more powerful message than either text or image can convey separately.

An object within a multimedia material is an element with some attribute. For instance, an object could be a piece of text with one or more attributes like font type, font size, color, etc. Similarly, an object could be an image with one or more attributes like size, location, sentiment like brightness, number of colors, resolution, etc.

The steps involved in analyzing multimedia material to identify multimedia-based advertisements (and perhaps attributes thereof) include: (a) extraction (b) segmentation, (c) detection, (d) annotation, and (e) Quality Assurance (QA) or reconfirmation. These steps are described in more detail herein. The embodiments disclosed herein use Artificial Intelligence (AI) and/or machine learning technologies for automating at least some of these steps.

In the context of the disclosed embodiments, extraction includes identifying and localizing objects within multimedia material. Objects in this context include elements like text, image, audio, video, and animation.

In the context of the disclosed embodiments, image segmentation includes partitioning a digital image (or other multimedia material) into multiple segments to simplify and/or change the representation of an image into something that is more manageable and easier to analyze. Image segmentation is typically used to locate boundaries (lines, curves, etc.) between objects within the digital image (or other multimedia material).

Segmenting advertising images is different from segmenting other types of images because the borders between different advertisements within one page/frame are not sharp and related image and text could be (and often is) contained in the advertisement. Although image contouring techniques for identifying the borders between images are well understood, this technique has been found to be unsatisfactory in real world applications. The problem in the present context is more challenging because an advertisement might contain both image and text elements. Further, advertisements are often separated and placed along a pre-specified row and column format expandable either in horizontal or vertical directions, and existing image segmentation methods are unable to determine boundaries between adjacent advertisements in a manner sufficiently satisfactory to identify where one advertisement ends and another begins.

For example, an advertisement could be placed side-by-side with a regular (non-advertisement) article which may not take a full column or row, and existing image segmentation methods are not able to discern where the article stops and the advertisement starts with an acceptable degree of accuracy. Similarly, in some instances, an advertisement could take the entire frame of image as most TV advertisements or full-page newspaper and magazine advertisements do. Further, some Internet videos have a small segment of advertisement video embedded before or in the middle of the main video content as the Internet video is played out. Existing image segmentation methods are unable to determine which segments of the Internet video correspond to advertising content and which segments of the Internet video correspond to the main video content (i.e., which segments are not advertising content).

The size of an advertisement is a good indicator of the advertiser's spending power. For example, an advertisement that takes up a full page of a newspaper or magazine is more expensive than an advertisement that takes up only a small portion of the newspaper or magazine page. Similarly, the sophistication of the design also represents the importance attached to these messages. For example, an advertisement with a high quality, professionally-created custom image with non-standard text overlay is more expensive to produce that an advertisement with stock images and straight-forward text layout.

The information like amount, price, discount etc., associated with a "number" is also significant information contained within an advertisement and as such, this information is of interest to advertisers and advertising agencies. The choices of color(s) in an advertisement also often represent a sentiment that the marketer would like to motivate the reader with. These pieces of information and associated annotation could predict important trends and as such, it is desirable to extract and process this information.

In the detection phase, logo size, text font size and location information (among other elements and attributes) are also important characteristics that are desirable to extract and process.

Some embodiments use Optical Character Recognition (OCR), which is a well-developed technology, for detection. Some embodiments supplement OCR with the new techniques in machine learning and AI disclosed herein, thereby improving the ability to identify information like hand writing even under low lighting and/or low-resolution conditions.

When identifying and analyzing text inside of an advertisement, fragmented text information may not fully represent the context and the meaning in a particular advertisement. Thus, in addition to identifying text information, it is often advantageous to analyze additional information like font size, type of font of the text, and the relative position of the text to other text and images/logos within the advertisement, etc., as these imply unspoken messages. In addition, the visual presentation like relationship of the texts and their relative importance when analyzed give lot of insight into the message being conveyed in the advertisement.

Heavier fonts and larger font size tends to draw attention of the readers or audience, thus, implying their relative importance. The larger font text on a top line of text followed by immediate smaller font text below the top line of text could be conveying secondary messages. This could be, for instance, the basis for rule-based classification.

There could also be multiple logos within an advertisement. The relative sizes of the logos could indicate which one of the logos is the owner of the advertisement and perhaps the focus of the product/service offered in the advertisement. Usually, the size of the logo indicates the focus of a particular business. For example, a supermarket chain might have a partnership with multiple brands. But in their advertisement, a particular brand might be highlighted using a bigger font and/or larger logo to attract buyers.

For this class of complex combinations, human analysis is generally unreliable and very subjective. An Artificial Intelligence (AI) based system with adequate "training" could do a better job in analyzing these complex combinations. The systems and methods disclosed herein thus rely at least in part on the use of AI. The process of "training" a Machine Learning (ML) model involves providing an ML algorithm (i.e., the learning algorithm) with training data to learn from.

Image annotation (also known as automatic image tagging or linguistic indexing) is a process by which a computer system automatically assigns metadata in the form of captioning or keywords to a digital image. Metadata is "data that provides information about other data."

While analyzing advertisements either manually or using computers, creating metadata and annotation information and then storing the metadata and annotations in a useful manner for further processing is very important. For example, one company may want to analyze its competitor's advertising to gain insight into the competitor's business strategies. Also, an advertising company may wish to analyze a customer's or a potential customer's advertising to help develop (or perhaps further develop) an advertising strategy.

Every advertisement has its own message to convey bounded by certain business conditions and its target audience group. The metadata or annotation(s) could be stored as a part of an image database, or it could be de-normalized (normalization in data analysis includes removing redundancy in the dataset; de-normalization reintroduces the redundancy) to be placed in multiple separate NoSQL databases (or other types of databases) suitable for machine analysis to generate different "hypothesis" for classification.

After all the machine processing steps are completed, when each image is segmented, annotated and detected, the image and the associated information are stored in a database or multiple databases to be used for a final check to ensure that all the processes have been done correctly. This step is called Quality Assurance (QA). In some embodiments the QA process is manual. Some embodiments combine automation with manual steps for QA.

For instance, if a portion of an image is misclassified as non-advertisement, the QA process re-classifies it as an advertisement. If a portion of an advertisement is not segmented properly from other images, the QA process is used to manually crop the image for re-annotation and detection by the automatic process.

So far, the individual steps in analyzing an advertisement have been discussed in the context of the challenges involved and the fact that these challenges need to be addressed.

In some embodiments, however, for ease of operation, the individual steps, additionally, are preferably linked into a 'work-flow' so that the operators can use the system effectively without requiring detailed knowledge of the individual steps. Therefore, in some embodiments, work-flow automation is very desirable.

Organizing images and processes in a meaningful and logical way and placing the intermediate and final results of automated analysis into an easily accessible file structure or database is an important aspect of the operation work-flow in some embodiments.

SUMMARY

The trend in advertisement nowadays is to use multimedia-based material to convey branding and other messages to a targeted audience. Multimedia material processing is challenging because text data as well as images and video contain useful information, which need to be processed for automatic detection, annotation and for organizing of advertisement related data and metadata. Extraction of the useful information involves detection, localization, tracking and recognition of the text, logo, icon, numbers/values and other relevant elements inside the multimedia material.

Analyzing this information helps marketers understand the nature of the market activities in a particular region or in the global market. Collecting and digesting of advertisement related information available in Internet, TV, and printed materials have so far been a manual and time-consuming process that includes manually collecting, extracting and analyzing advertisement information.

To improve this manual and time-consuming process, embodiments disclosed herein automate the process of analyzing advertising content using machine learning and AI methods. Some embodiments additionally create analytics that provide deeper insights into advertisement information.

Extracting information from a purely text-based content is relatively straight forward. See, e.g., R. Bansod et al., *Extraction of Advertising Words from Text and Image based Spam mails for Classification*, International Journal of Computer Applications (0975-8887) (October 2015); K. Jung et al., *Text Information Extraction in Images and Video: A Survey*, Pattern Recognition, Vol. 37, Issue 5, pp. 977-997 (May 2004); P. Sarathi Giri, *Text Information Extraction And Analysis From Images Using Digital Image Processing Techniques*, International Journal on Advanced Computer Theory and Engineering, Vol. 2, Issue 1, pp. 2319-2526 (February 2013). However, extracting information from pages and sequences of frames of images combined with text is not straight forward and in fact very technically challenging. See, e.g., R. Grishman, *Information Extraction: Capabilities and Challenges*, Notes prepared for the 2012 International Winter School in Language and Speech Technologies, Rovira i Virgili University, Tarragona, Spain (January 2012); C. P. Sumathi, et al., *Techniques and Challenges of Automatic Text Extraction in Complex Images: A Survey*, Journal of Theoretical and Applied Information Technology, Vol. 35, No. 2, pp. 225-235 (January 2012).

For instance, for an advertisement containing pictures and text, associating the pictures with the text in an advertisement with respect to their size and positions of the text is susceptible to different meanings. See, e.g., K. Jung et al., *Text Information Extraction in Images and Video: A Survey*, Pattern Recognition, Vol. 37, Issue 5, pp. 977-997 (May 2004); P. Sarathi Giri, *Text Information Extraction And Analysis From Images Using Digital Image Processing Techniques*, International Journal on Advanced Computer Theory and Engineering, Vol. 2, Issue 1, pp. 2319-2526 (February 2013). Some available services provide ways for identifying the purpose of an image using a "credit-based" approach with numerical values. See, e.g., Larry Hardesty, *Giving machine-learning systems "partial credit" during training improves image classification*, (October 2015) (available at https://phys.org/news/2015-10-machine-learning-partial-credit-image-classification.html). This "credit based" system requires an Application Programming Interface (API) call to a classification engine with the image as an "argument" and the classification engine returns classification information with various levels of confidence. However, the insights provided by the services are typically too general and often not useful for analyzing advertisement information.

In this disclosure, systems and methods are described for automating the process of extracting, segmenting, detecting and annotating information contained within advertisement. The systems and methods rely at least in part on the use of machine learning and AI and results in a much higher accuracy in information classification as compared to existing manual and automated systems. In operation, embodiments of the disclosed systems employ one or more processors and tangible, non-transitory computer-readable media configured to store instructions, wherein the instructions, when executed by the one or more processors, cause the systems to perform the computing functions disclosed and described herein.

Some embodiments include special-purpose software written especially to perform at least a portion of the analysis. One important aspect of some embodiments of the disclosed systems and methods includes a proprietary functional block (block 104 in FIG. 100) written using Python programming language or any other suitable programming language. This block improves the classification information returned by an off-the-shelf classification engine and is an important component for analyzing the advertisement information in a more meaningful and effective way.

The accuracy of classification information is improved in the disclosed systems and methods by segmenting a complex image into smaller images and then analyzing the smaller images for detecting and annotating the required information. This approach of "divide and conquer" coupled with the use of advanced machine learning and AI concept results in improved classification information over existing manual and automated processes.

Important steps in multimedia information processing generally include (a) segmentation, (b) detection, and (c) annotation/attribution. The systems and methods disclosed herein use improved AI based methods of segmentation, detection and annotation. In addition, an additional QA block is used to further improve the overall processing of the multimedia information.

Segmentation includes separating a print or video/internet advertisement from the other content in a newspaper or magazine (print), website (Internet), or video. Current approaches do not work reliably when the advertisement is embedded within the text of an article or within other information (e.g., embedded within a webpage or video). Even when the advertisement is not mixed with text inside an article, segmentation becomes difficult if one advertisement is adjacent to another advertisement. Even if the advertisement is a single advertisement, because of the size the advertisement, segmentation reliability is still often inadequate with existing methods. If the advertisement is in a print media, the quality of the copy also affects the reliability of the segmentation. The proprietary functional block 104 is used in the segmentation process described herein. The method includes identifying strips of border between images both in vertical and horizontal directions based on a specified number of pixels. The locations of the strips are determined by scanning the multimedia information in vertical and horizontal directions and looking for discontinuity in the image. If the discontinuity is of a size determined by the specified number of pixels, the system knows that a strip has been identified.

Detection includes identifying logo, message (headline, secondary, etc.), numbers related to the sales or promotion, icons and other information related to and/or contained within an advertisement.

Optical Character Recognition (OCR) techniques are used in connection with the detection function in some embodiments. Further analysis is done based on font type and size, absolute and relative position in the advertisement, the color etc. Whereas a human can read grey levels and color, the OCR software is still reliant on there being a clear contrast between foreground and background (between black and white in a newspaper text for example) to be able to distinguish what is text and what is background page. Thus, OCR processes are not very reliable and in some embodiments, rely on some form of statistical approach or neural network-based inference engine to improve the reliability of the detection. In the present disclosure, a multiple step approach is used for detection. The first step includes the use of an off the shelf computer vision package (e.g., OpenCV) for filtering and enhancing the image quality. The next step includes applying another off-the-shelf image analysis software package (e.g., Google Cloud Vision), which receives the image information as "argument" and returns information regarding the likelihood of the image being an advertisement or not, a car or not, is there a logo or not, etc. The functional block 104 which has learning capability built-in also has image analysis capability similar to Google Cloud Vision package and becomes an additional source of information regarding the likelihood of the image being of a particular kind. This confidence information is combined with the information from the off-the-shelf package (e.g., Google Cloud Vision) using a weighting to obtain the final confidence level of the image being of a particular kind. This process improves the overall detection reliability beyond what the use of the combination of computer vision package (OpenCV) and the image analysis package (Google Cloud Vision) would have resulted in.

The annotation step includes adding metadata to the extracted advertisement after proper segmentation and detection.

Reliably organizing detected objects into a meaningful set of information for machine analysis is another important component of annotation. Currently a manual process is generally used for annotation, where a form with fixed annotation fields is filled in by a human operator every time an image is annotated. The embodiments disclosed herein implement a dynamic and automated annotation scheme where the elements in the annotation fields correspond to the elements (text, image, audio, video, and animation) in the multimedia materials and objects identified by extracting semantic information out of the multimedia material. The annotation information with dynamic element fields are organized in a database for further analysis to determine the "semantic insights" into the advertisement information. "Semantic insights" has to do with "meaning level information" in large diverse information sources like multimedia materials.

Words have their own meaning. The dictionary definition for words like "sale" or "on sale" are similar, but each has a slightly different meaning. A Word Entry Recognition (WER) Database is used to identify key words and the characteristics of those key words including their purposes like brand-name, model-name as a node or "on sale" as a relationship between two nodes in an object relationship tree. This relationship tree describes the semantic relationship among a group of objects. Synonyms to a key word will also be linked in the WER database. Synonyms of a keyword imply a certain relationship which generally is a one-way implication in mathematical sense. For instance, the word "like" as a verb might imply "love" or "prefer." But the word "prefer" might not be the synonym of the word "love."

In addition to the WER database, some embodiments use a rule database, Semantic Application Rule (SAR) database, to extract or infer the relationships between two objects. For instance, an object could be a car and another object could be a number close to a car. The rule in the SAR, for example, could dictate that the number close to the image of a car represents its selling price or its model year. In the current operation, a human operator intuitively uses these rules of association to relate two objects. In this disclosure, an AI-based process replaces the human operator.

Some embodiments of the disclosed systems and methods use a rule-based scheme to categorize the advertisement into segments like automobile or real estate or cosmetic products for example. This approach is further enhanced using a "supervised learning" approach. As known in the art, supervised learning is the machine learning technique of learning a function that maps an input to an output based on example input-output pairs. It infers a function from labeled training data that includes a set of training examples. In supervised learning, each example is a pair that includes an input object (typically a vector) and a desired output value (also called the supervisory signal). A supervised learning algorithm analyzes the training data and produces an inferred function, which can be used for mapping new examples.

In the QA step, the images which cannot be segmented or advertisements which cannot be annotated by the automated process with a high confidence are processed by operators with the assistance of an Artificial Intelligence (AI) based "Advisor." In operation, some embodiments use a combination of humans and algorithms to make decisions regarding segmentation and annotation of multimedia information which are not correctly processed by the automated segmentation and annotation functions. The automated segmentation and annotation functions might result in over-segmentation or under-segmentation. To correct instances of over-segmentation or under-segmentation, and to improve the system's ability to properly segment the advertising information and reduce the likelihood of future over or under segmentation, the "Advisor" function is trained by human operators using "tagged" improperly or properly segmented image material. "Tagging" in this AI context means associating an image with an object for instance. The word "Labeling" and "Tagging" are used synonymously.

Over-segmented advertisements clustered together with similar/coherent logo/messages/icon/pictures etc. along a shared border during automated segmentation process could be an indication that they should belong to the same advertisement instead of separate advertisements. A "recombination process" is performed to consolidate the over-segmented image into a single image. Re-detection and re-annotation are performed after the recombination process by invoking the automated detection and annotation process. The recombination process relies on detecting small clustered segments with shared borders resulting from over-segmentation and detecting shared semantic information among clustered segments. Once these functions are done, the next step includes combining small segments into a bigger segment with integrity of spatial relationship followed by re-detecting and re-annotating the recombined bigger segment.

In some instances, the under-segmented image is manually segmented by the human operator and the human operator also annotates the segmented advertisement. This is done by cropping the image for further processing out of the combined text and image material.

For productivity improvement, some embodiments include feeding the cropped image to the annotation engine to reduce the annotation time and improve quality. This cropped image and the manual annotation information become part of the dataset which is used for "training" the neural network-based classification engine referred to above.

Some embodiments also include the implementation of a Work Flow process. This process includes organizing the earlier mentioned set of tasks for the operators so that the operators are more productive and the whole process is more reliable. The work flow process is reconfigurable by the human operator.

As a part of the work-flow process, the images are collected and segmented into individual advertisement images. Then each of the individual advertisement images is processed so that text, logo, sentiment and other associated information including the purposes of the image are identified and annotated. Two categories of images and their respective annotation/metadata are created: one category which does not require further human manipulation and another category which requires manual intervention as part of Quality Assurance (QA) process.

Images and associated annotation/metadata in the category which does not require further human QA are stored into storage for future processing. Images and associated metadata in the category which does require QA will go through a visual inspection. The inspector (human operator) will fill in the missing or incorrect information using his/her judgement of annotation/metadata into the corresponding database using an appropriate software tool.

As a part of work-flow, in some embodiments, an image is loaded into the work-flow module from the external cloud storage. Then, the image is segmented into multiple images using the proprietary function 104 module followed by forwarding each segmented image to the external cloud platform for detection and annotation. Then, all the information will be stored back into the cloud storage for the final QA process.

In some embodiments, the work-flow module will wait for the final QA to be done to give the indication that the work-flow of a particular batch of images is done. During the QA process, an image can be chosen for inspection to validate the detected and extracted information including the annotation. When an image is chosen, its associated metadata (detected and extracted information) and annotation are loaded into the work-flow module; an inspector can inspect its file location, classification and other metadata for validation. Wrongly segmented advertisement data within an image is cropped by an inspector using an embedded cropping facility in the proprietary algorithm module so that the cropped advertisement image can be re-processed.

Some embodiments are able to create a customizable work flow. The customization can be based on requirement of a particular customer or the skill set of the operators. The customization can also be done based on batch history.

DETAILED DESCRIPTION OF THE DRAWINGS

Figure 1:
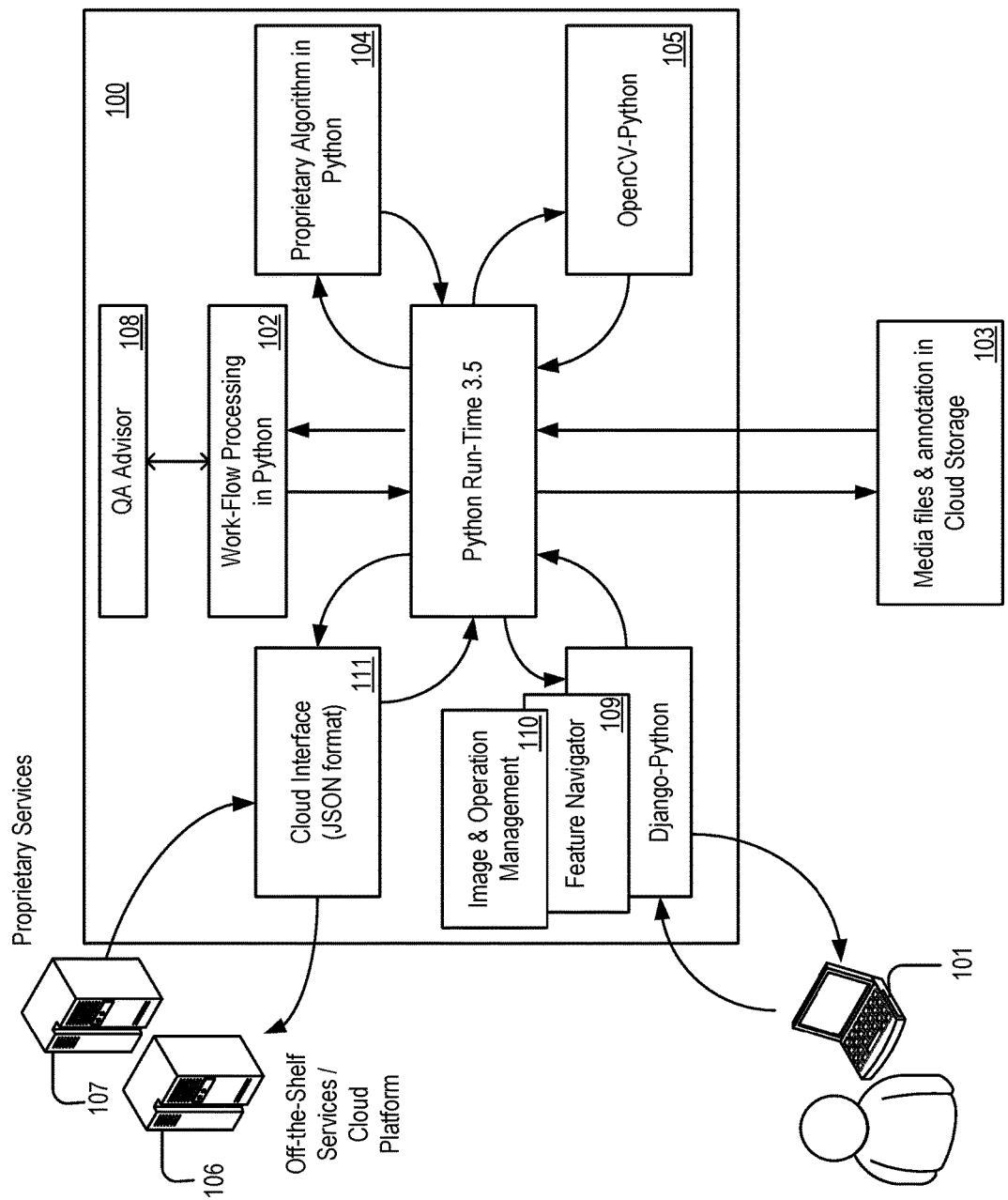
FIG. 1 shows the top-level architecture of one example preferred embodiment.

FIG. 1 shows one example of the overall system architecture according to some embodiments. In operation, a user 101 accesses and directs the system operation through a graphical user interface compatible with common browsers like Google Chrome. The user can upload or download any multimedia material to or from the system storage; this system storage could be located in a cloud-based storage complex of any Cloud Service Provider. This system 100 also provides menu-based access, 109, to the system for manual and automatic operation for operations on the multimedia materials. The menu-based access offers operations on the multimedia materials stored in the system storage using functions in the proprietary algorithms block 104, OpenCV block 105, or the external service which in some embodiments includes an off-the-shelf service 106 like Google Cloud Vision or a proprietary service 107. The resulting multimedia materials and associated detection results are stored in the designated location in system storage. This menu access also provides an interface in 110 for system configuration and provisioning and uploading and downloading of the images to the Cloud Storage 103.

The work-flow block, 102, performs the operations of a normal batch operation configured by the users. In this example, segmentation, detection, annotation, and Quality Assurance (QA) functions can be plug-ins to be used on the specified multimedia materials according to the provisioned sequence. For example, based on the configured work-flow block, a multimedia material is first segmented into smaller fragments using functions offered in the proprietary algorithm, 104, and OpenCV blocks, 105. Then, detection of multimedia element objects is performed using the external services, 106 and 107, through the cloud interface block, 111, and the functions implemented in the proprietary algorithms block, 104, on the fragments. Then, the annotation operation in the work-flow exports the semantic representation of each of the identified fragments into a pre-defined file system. This is then followed by checking the integrity of each of any fragmented multimedia materials for any potential anomalies including over-segmentation and under-segmentation as part of the QA process. The QA Advisor block, 108, provides QA analysis results and possible goals for the operator to attain using manual operations. Additional functions can be plugged-in using the menu access operations.

Figure 2B:
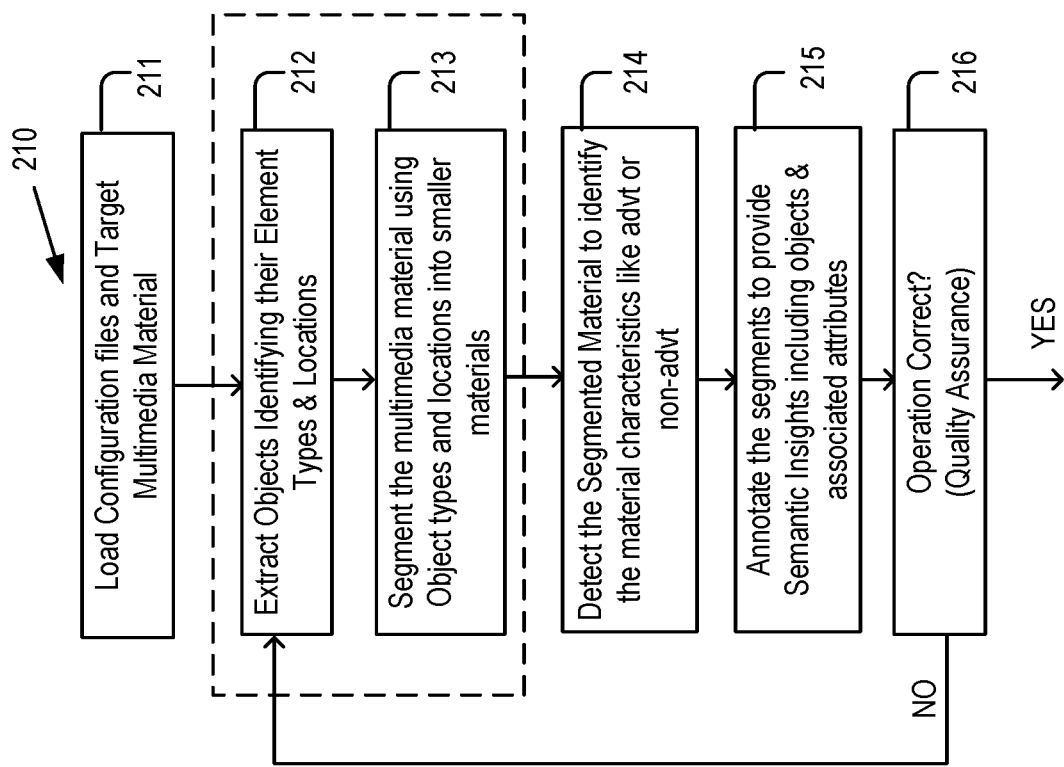
FIGS. 2A and 2B show example processes for a top-level operation flow-chart according to some embodiments.
Figure 2A:
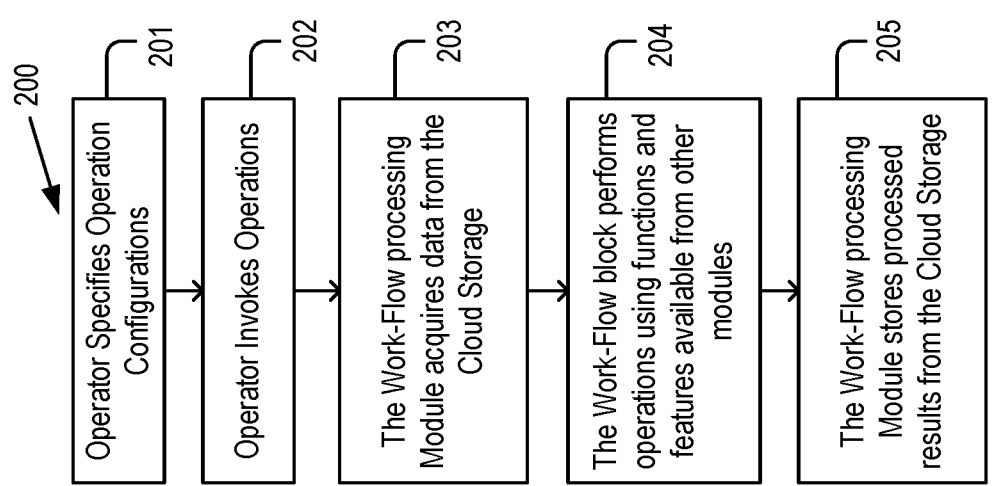

FIG. 2A shows the example flow chart, 200, for the top-level operation processes illustrated in FIG. 1. Block 201 represents a sequence of operations to configure the overall operations of the system and prepare the multimedia materials as the target to be operated upon. Once all the preparations are ready, the operator invokes the operation as indicated in block 202. Then, the work-flow block, 102 in FIG. 1, acquires the multimedia material from the Cloud Storage as indicated in block 203 followed by performing the specified operation automatically according to the work-flow as indicated in 204. Many of the functions required in 204 are not available in the work-flow block 102; as a result, the functions and features are called upon from blocks 104, 105, 106, and 107. As indicated in block 205, the resulting fragments of multimedia materials and their corresponding detected attributes, annotations and logs are stored in the cloud storage. The detailed operations on segmentation, detection, annotation and quality assurance are further described in the Figures described next.

FIG. 2B shows the top-level flow-chart of process 210, which is an example Media Intelligent Automation operation utilizing the architecture described in FIG. 1. As described below, process 210 includes (1) block 211, which includes receiving multimedia material for analysis, where the multimedia material comprises at least one of print media, television, internet text, internet images, and internet video, (2) block 212, which includes extracting one or more elements from the multimedia material (each element comprising at least one of an image, icon, logo, or text), and forming one or more objects comprising the elements based at least in part on one or both of each element's location and size, (3) block 213, which includes segmenting the multimedia material into one or more segments, where individual segments of the multimedia material comprise two or more objects located within a threshold distance from each other (perhaps otherwise having a semantic relationship to each other), (4) block 214, which includes detecting one or more objects within at least a first segment comprising two or more objects, and associating attributes with the detected objects, (5) block 215, which includes annotating the first segment comprising the two or more objects, and (6) block 216, which includes a quality assurance step comprising analyzing one or more of the first segment and annotations of the first segment, and flagging one or more of the first segment and the annotations for human review.

The first step includes loading relevant configurations and target media files to be analyzed into the system in block 211. At block 212, the multimedia elements (e.g., text, figures, logos, images, etc.) of the multimedia content are identified and extracted, and then the extracted elements are grouped into objects. As described herein, in some embodiments, extracting and/or identifying one or more elements from the multimedia material and forming objects comprising the elements includes one or more of (i) identifying an individual element within the multimedia material; (ii) determining a location of the individual element within the multimedia material; and (iii) inferring at least one semantic relationship between the individual element and at least one other element within a threshold distance from the determined location of the individual element based at least in part on an application of rules from a semantic application rule database. In some embodiments the extraction function additionally or alternatively include extracting one or more elements from the multimedia material and forming one or more objects comprising the elements based at least in part on one or both of a location and a size of the individual elements. In some embodiments, extracting one or more elements from the multimedia material and forming one or more objects comprising the elements based at least in part on one or both of a location and a size of the individual elements includes: (i) identifying an individual element within the multimedia material; (ii) determining a location and a size of the individual element within the multimedia material; and (iii) inferring at least one relationship between the individual element and at least one other element based at least in part on a distance between the individual element and the at least one other element.

Figure 6:
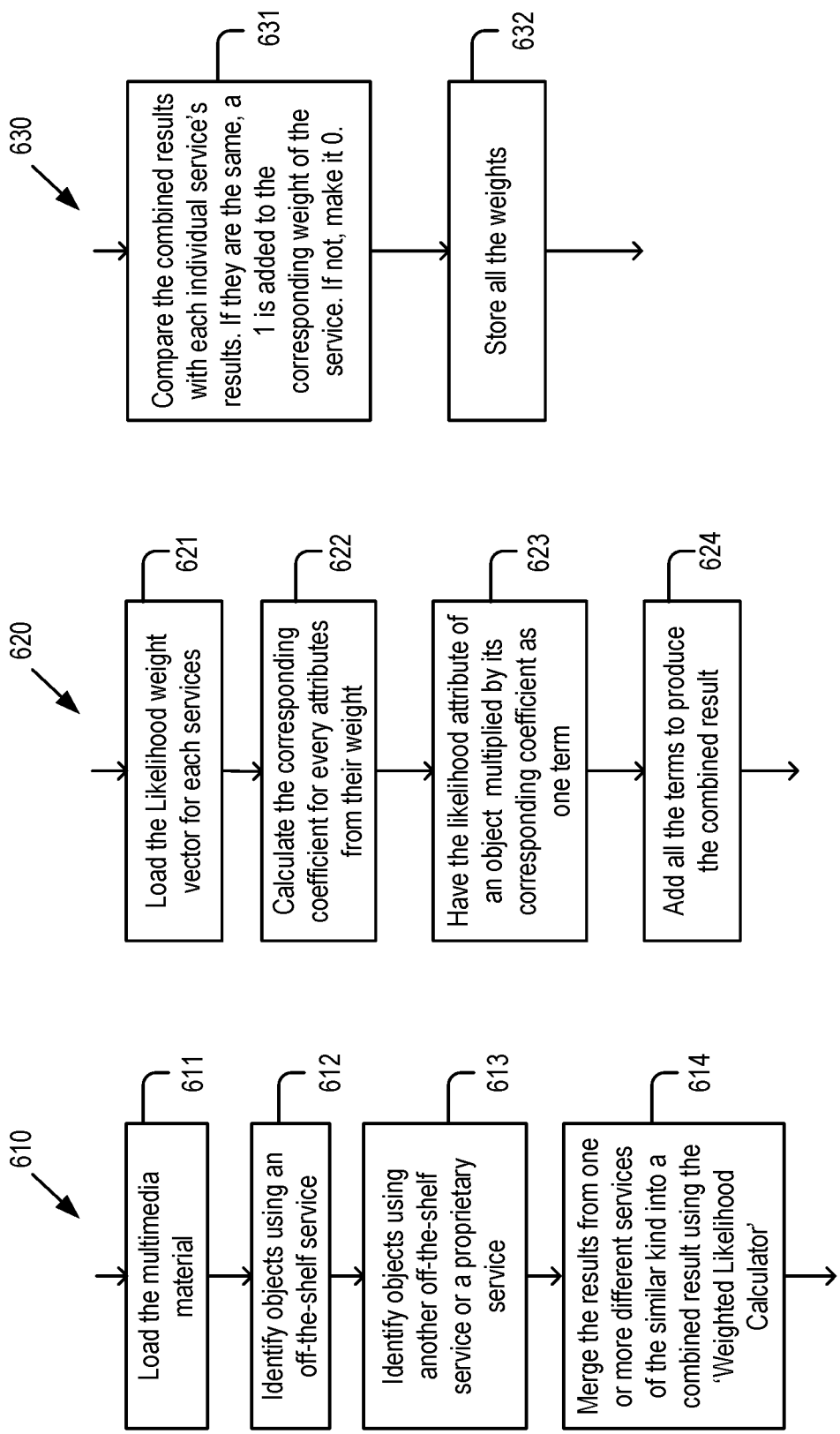
FIGS. 6A, 6B, and 6C show example flow-charts of the detection process according to some embodiments.

Next, the process advances to block 213, which includes placing demarcation strips and lines between the objects. Invalid strips and lines are removed. Redundant strips and lines are then combined in block 213. This results in a grid of strips and lines to become the basis for the segmentation process. Details of these procedures are discussed in further detail in FIG. 4. In some embodiments, blocks 212 and 213 are treated as an integrated operation as depicted in the architecture diagram of FIG. 1. Block 214 includes detecting the contents of the segmented multimedia material using various services which could be either off-the-shelf or proprietary as discussed in more detail in FIG. 6. Block 215 includes constructing the annotation of the segmented media material by forming an object relationship tree or subtrees using semantic analysis. Block 216 includes examining the correctness of this Media Intelligent Automation process using a Quality Assurance (QA) process. This QA process in this disclosure is a combination of manual operation and an AI based "Advisor" as shown in and described in more detail with reference to FIG. 10.

Figure 3:
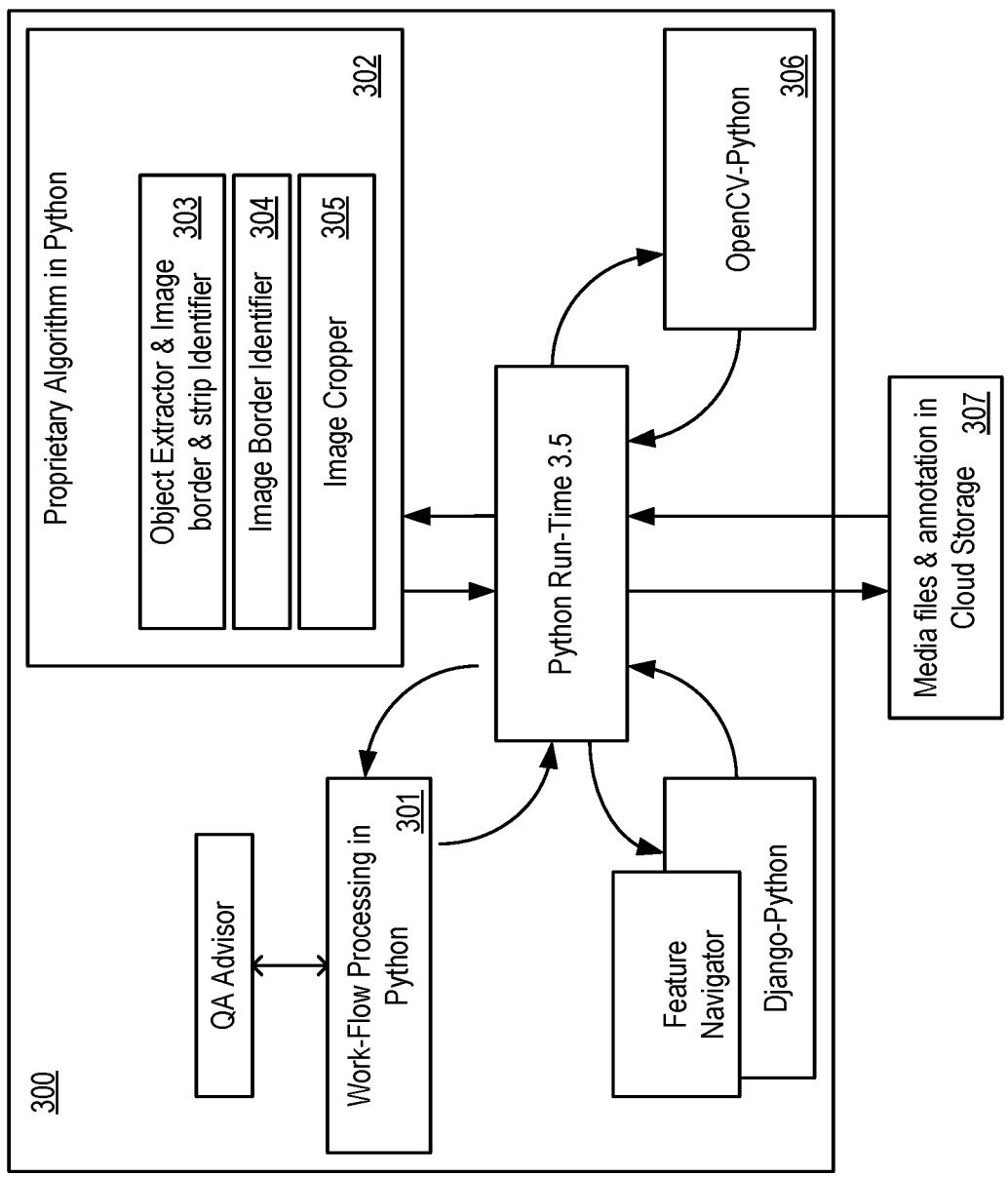
FIG. 3 shows an example of block diagram focusing on segmentation according to some embodiments.

FIG. 3 shows the example architecture, 300, focusing on the segmentation operations. In some embodiments, the segmentation operation resides in the work-flow block, 301, and it also calls the functions from proprietary algorithm block, 302, and OpenCV block, 306, to identify the location of the segments in the multimedia material. Some embodiments use OpenCV, which is an open-source software package which offers image processing services. The use of the OpenCV, 306, is to enhance the contrast of the major objects in the multimedia material from their surroundings and to remove unnecessary noise from the multimedia material. In order to find the border between self-contained multimedia materials, the lines and spaces separating them are the demarcations which are determined by the block 303. This line could be either a solid line or a dashed line. When there are no easy identifiable edges between two multimedia materials, a strip of solid area, like an all-white area, can be considered as a demarcation. As mentioned earlier, this function is provided in the Image Border & Strip Identifier, 303, in the proprietary algorithm block, 302. Once strips and edges separating self-contained material are identified, a grid can be formed by using the Image Block Identifier, 304. Parallel strips and lines less than a specified distance can be considered to constitute the same border. Intersections of the vertical and horizontal lines and strips are identified as the corner candidate of a possible self-contained multimedia material. Once a candidate is identified, a graphical traversal approach is used to find the next intersection as another corner candidate which shares the same border of the previously visited corner candidate. When all the intersections are identified and examined, square and rectangular areas with at least three corners already visited are considered valid fragments to be cropped using the Image cropper, 305. Any potential over-segmentation or under-segmentation are checked during the QA operation.

Figure 4B:
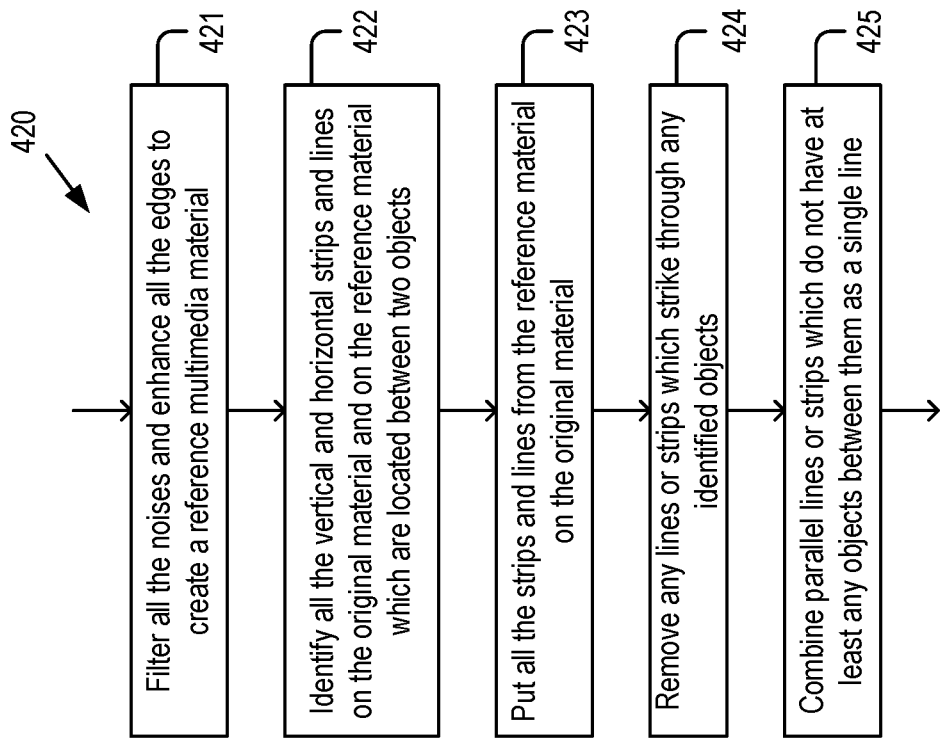
FIGS. 4A, 4B, and 4D show example flow-charts of the segmentation process according to some embodiments.
Figure 4A:
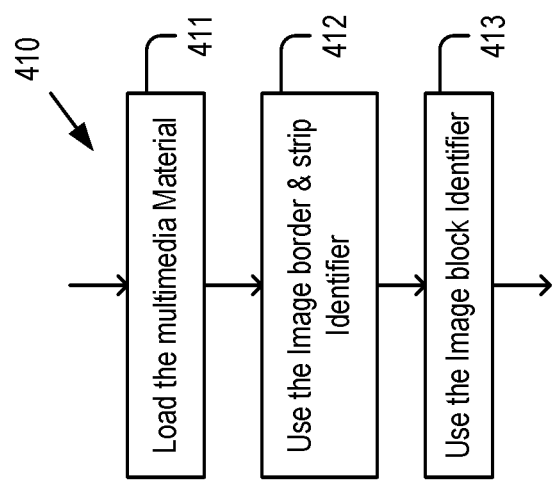

One of the major operations performed by the work-flow block 301 is the segmentation operation. FIG. 4A shows the example process 410 of the segmentation operation using functional blocks described in architecture diagram 300. As described further below, in some embodiments, the segmentation operation includes (1) generating a plurality of segments formed by a grid of horizontal strips and vertical strips in the multimedia material, where an individual vertical strip is located between at least two objects, and wherein an individual horizontal strip is located between at least two objects, and (2) for each segment, determining whether one or more objects within the segment are semantically-related to one or more objects within an adjacent segment, and in response to determining that one or more objects within the segment are semantically-related to one or more objects within the adjacent segment, combining the segment with the adjacent segment and removing at least a portion of any horizontal strip or vertical strip between the segment and the adjacent segment. In some embodiments, the segmentation function includes segmenting the multimedia material into one or more segments, where individual segments of the multimedia material comprise two or more objects located within a threshold distance from each other. In some embodiments, segmenting the multimedia material into one or more segments includes generating a plurality of segments formed by a grid of horizontal strips and vertical strips in the multimedia material, wherein an individual vertical strip is located between at least two objects, and wherein an individual horizontal strip is located between at least two objects.

First, block 411 includes loading a target multimedia material into the system. Next, block 412 includes identifying the separation borders of two adjacent multimedia elements including image, text, audio, video, and/or animation. When there is a clear line located between two objects, this line can be a border between two self-contained items of multimedia material. For an advertisement to be a self-contained item of multimedia material, the semantic information associated with this advertisement should be identifiable as different from the main (non-advertisement) content of the multimedia material. In most cases, this advertisement cannot be a stand-alone object without supporting semantic meanings from other objects. In other words, this advertisement should have self-contained object tree or trees with meaningful semantic representation. As a result, valid border lines shall separate a group of objects from other objects. Likewise, a solid mono-colored area or strip can serve as the border between an advertisement and other (non-advertisement) content, the border between two or more advertisements, or the border between other objects or groups of objects.

A detailed procedure to identify the borders between advertisements and non-advertisement materials is shown in and described with reference to FIG. 4B. Once valid borders are identified in block 412, procedure 410 advances to block 413, which includes identifying the self-contained material with semantic meaning as a group of objects. The relative positioning of each object within the broader image or media implies its relationship with the adjacent objects; other indicators could be object size, font types, color, etc. The cross-point and intersection of the vertical and horizontal borders represent the possible four corners of an advertisement. The detailed description of this procedure is shown in and described with reference to FIG. 4C.

As described previously, one aspect of the disclosed systems and methods includes identifying the borders of a self-contained multimedia material with semantic meaning like an advertisement. FIG. 4B is an exemplary process, 420, to perform a media segmentation function according to some embodiments.

Process 420 begins at block 421. At block 421, in addition to the original multimedia material, additional reference materials are generated using filter functions and image enhancement functions. For example, a standard differential function applied to two solid color areas can identify clearly the border between two advertisements. By creating and using the reference multimedia material, objects in the original multimedia material can be better identified.

Next, process 420 advances to block 422. Block 422 includes identifying all the objects (or at least the more important objects) in a multimedia material. In some embodiments, identifying all the objects (or at least the more important objects) in a multimedia material is achieved by referring to the reference material.

Next, process 420 advances to block 423, which includes identifying and putting together the strips and lines by scanning through the entire (or most of the) multimedia material and its reference material.

Next, process 420 advances to block 424, which includes removing lines and strips intersecting through an object.

Next, process 420 advances to block 425, which includes removing redundant strips and lines by identifying parallel strips and lines without any objects in between or if their distance is less than a threshold.

Figure 4D:
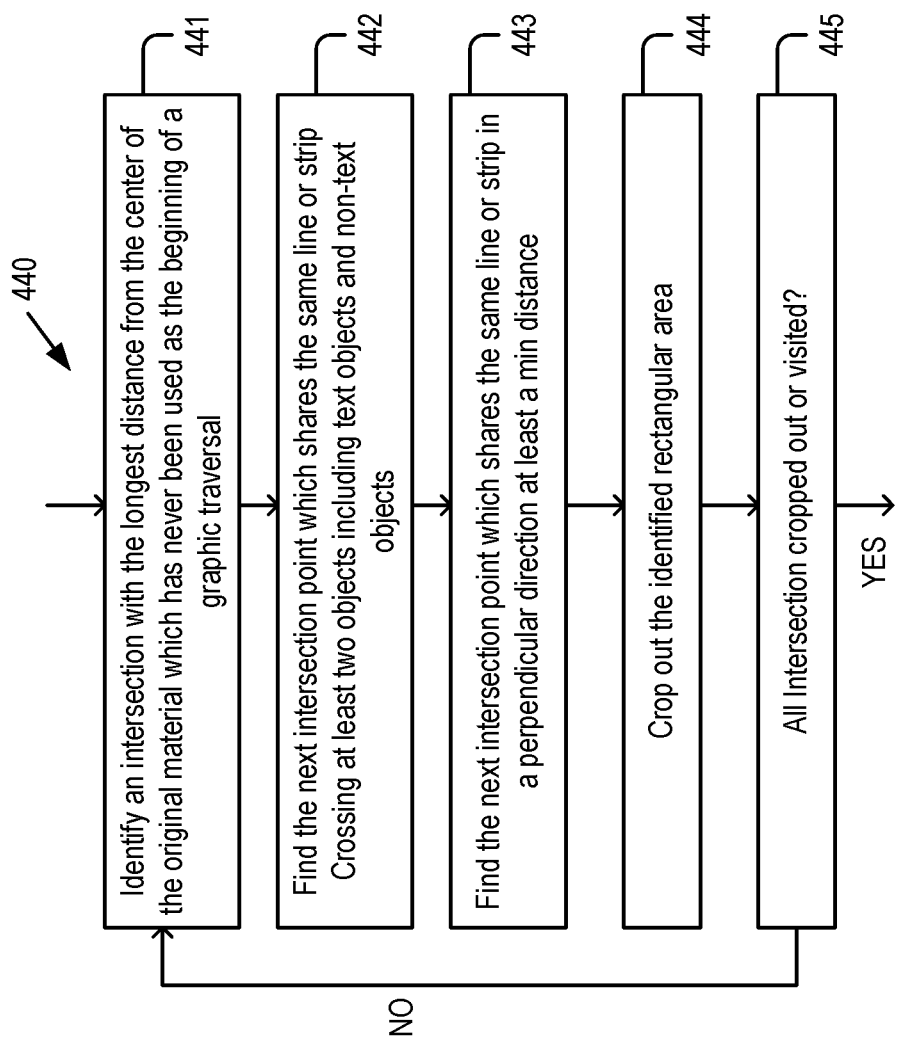
Figure 4C:
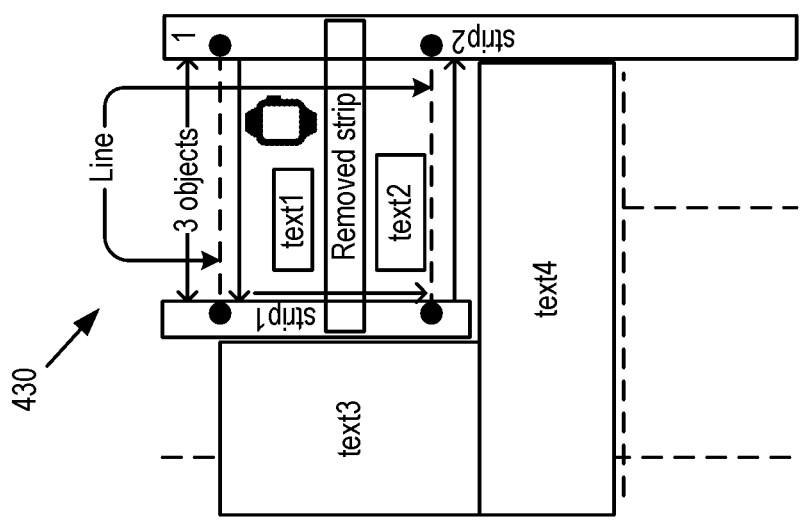
FIG. 4C shows an example of aspects of the segmentation process according to some embodiments.

FIG. 4C shows an example 430 of segmenting a self-contained fragment within a multimedia content from the rest of the larger set of multimedia content; this is used to illustrate the segmentation process.

There are 4 text-blocks (text1, text2, text3, text4) in the page as shown in 430. Among them, two (text 1 and text 2) are disjointed islands and two (text3 and text4) are connected rectangular blocks to form a continent or larger composite block. There are two horizontal lines which have been identified; one is on top of text1, the other is between text2 and text4. There are three strips identified; however, one of them which is a horizontal strip is removed because between this strip and the line below there is only one object (text2) identified. One of the strips at the right to both text2 and text4 blocks is vertical through the entire page; the other strip between text1 and text3 runs from the top of the page until it reaches text4. Cross-point or intersection '1' being the farthest from the center of this page, it is selected to be the starting point. The traversal of this grid of strips and lines identify the second corner to be the cross-point or intersection of the top line with strip1. The third corner can be found at the cross-point or the intersection of strip1 with the second line between text2 and text4. The fourth corner can be identified at the intersection of the second line and strip2 as shown in 430. These 4 cross-points or intersections constitute the rectangular area an image cropper can separate out of the original multimedia material. This is further explained using the flow-chart 440 in FIG. 4(*d*).

FIG. 4D shows process 440, which performs the Image Block Identifier 413 function. As explained previously, an advertisement should have its own unique semantic meaning distinguishable from the rest of the multimedia content on a page, a webpage, or a media stream. In addition, the advertisement should contain geographically close objects in the original multimedia material, i.e., objects that are spatially close to each other in the original multimedia material. In some embodiments, cross-points or intersections of bordering strips or lines are used as points of reference to the geographical area of interest.

Next, process 440 advances to block 441, which includes selecting a cross-point or intersection of two lines or strips which are preferably located to the periphery of the original multimedia material as the starting point of the identification of rectangular advertisement area.

Next, process 440 advances to block 442, which includes identifying the border of a rectangular or square area which most likely represents the area of an advertisement with self-contained semantic meaning. In operation, this task uses information from both the original multimedia material and one or more reference materials. The reference material includes filtered and/or enhanced version of the original multimedia material (e.g., filtered and/or enhanced versions of the original multimedia material generated by OpenCV and/or other image processing software). In operation the borders and the intersections analyzed in block 442 form a grid which corresponds to the searching domain of the procedure in block 442.

Next, process 440 advances to block 442, which includes taking one cross-point or intersection as the first corner to find the next cross-point or the intersection as the second corner of the rectangular area by following one line or strip with minimum length. The third corner of the rectangular area is identified at method block 443 following the perpendicular line or strip which meet in the second corner. From the third corner, the forth corner can be found following the same process. If only three corners can be identified, this rectangular area can still be identified. Once the rectangular areas suitable for advertisement are identified, those areas are cropped automatically 444 to create an independent fragment of the multimedia content to be further processed by other operations in the work-flow. When all the cross-points and intersections are visited by the above traversal process, the search for a possible self-contained fragment stops at method block 445; otherwise, the process goes back to method block 441 for one or more additional iterations.

Figure 5:
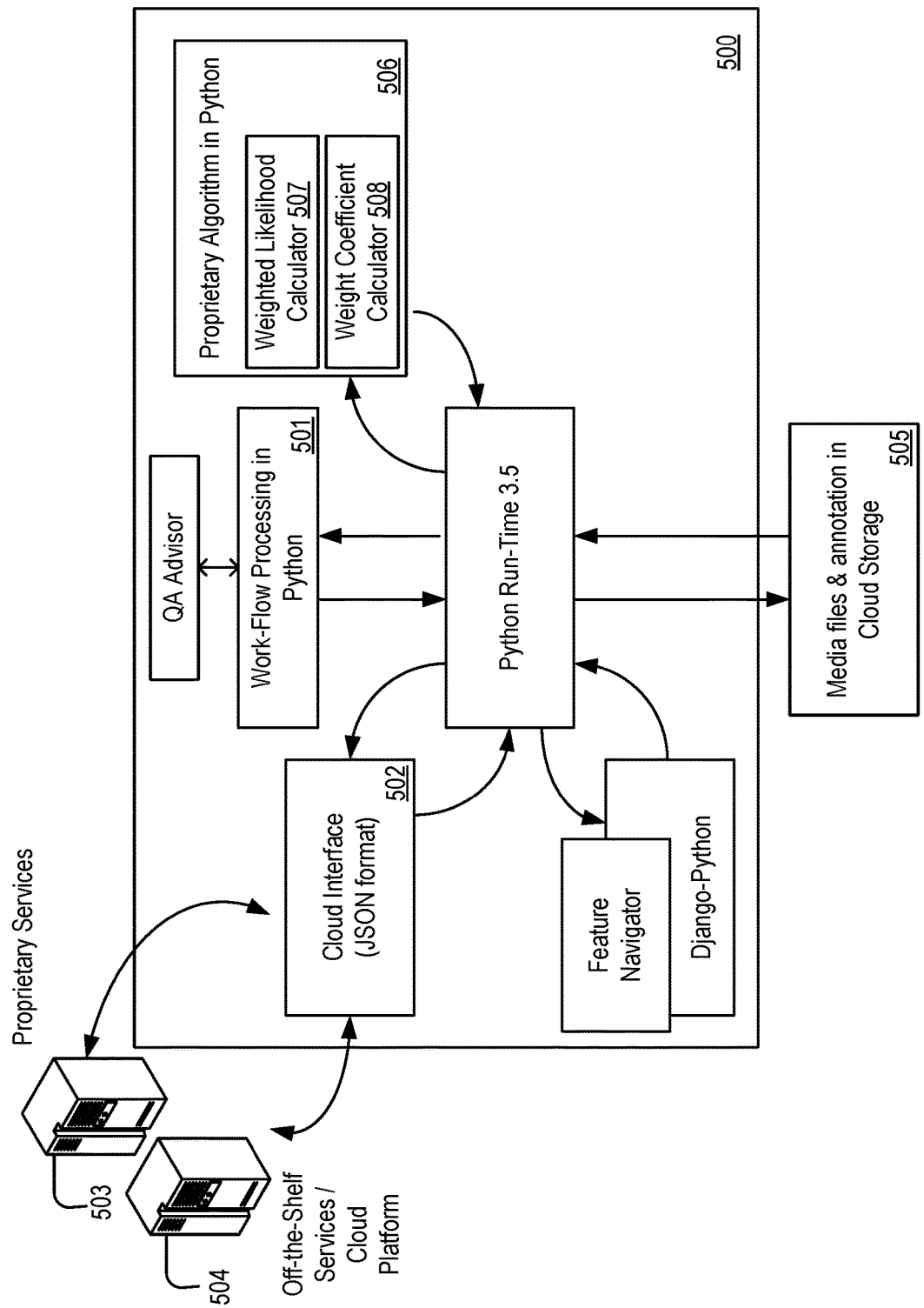
FIG. 5 shows an example of block diagram focusing on object detection according to some embodiments.

FIG. 5 shows an exemplary architecture 500 according to some embodiments. The example in FIG. 5 focuses on the detection operation performed by the work-flow block 501. As described in more detail below, in some embodiments, the detection step includes (1) providing the first segment as an argument to at least one machine learning classifier; and (2) receiving a classification of the first segment with one or more confidence levels from the at least one machine learning classifier, wherein the classification comprises one or more of (a) an identification of an object in the first segment with a corresponding confidence level of the identification, and (b) an indication of whether the first segment is or is not an advertisement with a corresponding confidence level of whether the first segment is or is not an advertisement. And in some embodiments, the detection step includes (1) providing the first segment as an argument to a first machine learning classifier; (2) receiving a first classification of the first segment with one or more confidence levels from the first machine learning classifier, wherein the first classification comprises one or more of (2-a) a first identification of an object in the first segment with a corresponding first confidence level of the first identification, and (2-b) a first indication of whether the first segment is or is not an advertisement with a corresponding first confidence level of whether the first segment is or is not an advertisement; (3) providing the first segment as an argument to a second machine learning classifier; (4) receiving a second classification of the first segment with one or more confidence levels from the second machine learning classifier, wherein the second classification comprises one or more of (4-a) a second identification of the object in the first segment with a corresponding second confidence level of the first identification, and (4-b) a second indication of whether the first segment is or is not an advertisement with a corresponding second confidence level of whether the first segment is or is not an advertisement; (5) weighting one or more components of the first classification and the second classification based on historical accuracy of prior classifications from the first machine learning classifier and the second machine learning classifier; and (6) based on the weighting, determining one or more of (6-a) an identification of an object in the first segment and (6-b) whether or not the first segment is an advertisement.

One goal of the detection operation is to identify and extract objects which can be a semantically meaningful multimedia element of any kind like text, icon, graphics, animation, etc. inside a self-contained multimedia material, such as an advertisement. Additional tasks are performed to identify one or more icons or graphics which can be a candidate for identification as a valid logo. In some embodiments, the detection operation also provides a likelihood that this particular material could be an advertisement of any kind including automobile, real-estate, cosmetic products, etc. The detected attributes associated with each object are then used in the annotation operation.

As shown in FIG. 5, in some embodiments, object detection is performed by providing the multimedia material to an external service like Google Cloud Vision, 504, via the interface block, 502. There could be multiple service providers offering services similar to Google Vision. In addition, a proprietary service, 503, using machine learning can be used for multimedia material classification and identification built for specific businesses or industries. In order to merge and consolidate results from various classifiers and detectors tuned for different objectives, the proprietary method, 507 which in some embodiments is a Weighted Likelihood Calculator, is used to combine results from multiple services offered by the proprietary algorithms block, 506.

FIG. 6A shows exemplary process 610 for the detection operation according to some embodiments.

Process 610 begins at block 611, which includes loading each fragment of multimedia material from cloud storage 505 or perhaps another type of storage.

Next, process 610 advances to block 612, which includes providing the multimedia material to one of the off-the-shelf cloud service 504 via the cloud interface 502. In some embodiments, method block 612 also receives the results from off-the-shelf cloud services 504 via cloud interface 502 (FIG. 5).

Next, process 610 advances to block 613, which includes sending the multimedia material to a different cloud service of similar characteristics, such as a proprietary service 503. In operation, such a proprietary service may include or otherwise implement one or more machine learning platforms that have been trained using advertisement-specific images and advertisement objects of any specific industry. As a result, this machine learning platform 503 could perform better in identifying advertisement-related logos and icons than a general purpose image processing system like Google Cloud Vision.

Next, in at least some embodiments, process 610 advances to block 614, which includes merging results from both proprietary services 503 and off-the-shelf services 504 into a combined result using the Weighted Likelihood Calculator as shown in FIG. 6(b).

FIG. 6B shows an example subroutine 620 for performing method 614 of process 610 in FIG. 6A. In some embodiments, subroutine 620 includes implementing a Weighted Likelihood Calculator. One implementation for this Weighted Likelihood Calculator is used to get weights associated with each service (e.g., services 503 and 504) for a particular attribute followed by calculating the variance from the combined result.

For example, assume that the likelihood an image is a car as determined by service 503 is 70% but the likelihood the image is a car is 40% from the service 504. If the cumulative weight of a car icon from service 503 and service 504 are 100 and 150 respectively, the combined likelihood should be (70%×(100)+40%×(150))/(100+150)=52%. This process is illustrated in subroutine 620.

Subroutine 620 begins at block 621, which includes loading both weights 100 and 150 from a weight database corresponding to service 503 and service 504.

Next, subroutine 620 advances to block 622, which includes calculating coefficients, e.g., 100/(100+150)=0.4 for service 503 and 150/(100+150)=0.6 for service 504.

Next subroutine 620 advances to block 623, which includes multiplying the number 70% from service 503 with its coefficient 0.4 resulting in 28%; and multiplying 40% from service 504 with its coefficient 0.6 resulting in 24%.

Next, subroutine 620 advances to block 624, which includes combining these two results by adding them together to produce a 52% likelihood that the image is a car, which leads to a decision that a car is detected, i.e., that the advertisement under analysis includes an image of a car.

The weights correspond to the cumulative correct classification result when both services 503 and 504 are used. This is described in subroutine 630 shown in FIG. 6(c). In this case, the new cumulative weights will become 101 for service 503 and 150 for service 504 as shown in block 631. For service 503, the resulting classification of 70% represents a correct classification; as a result, a 1 can be added to the existing value of 100 to become 101. For service 504, since its result is incorrect when compared with the combined result, it does not contribute to any additional weight to be accumulated. And at block 632, the resulting weights are stored into the weight database. Other methods of weighting results from multiple classifiers and combining the weighted results to determine the classification of a segment (e.g., advertisement or not) or classification of objects contained within a segment.

Figure 7:
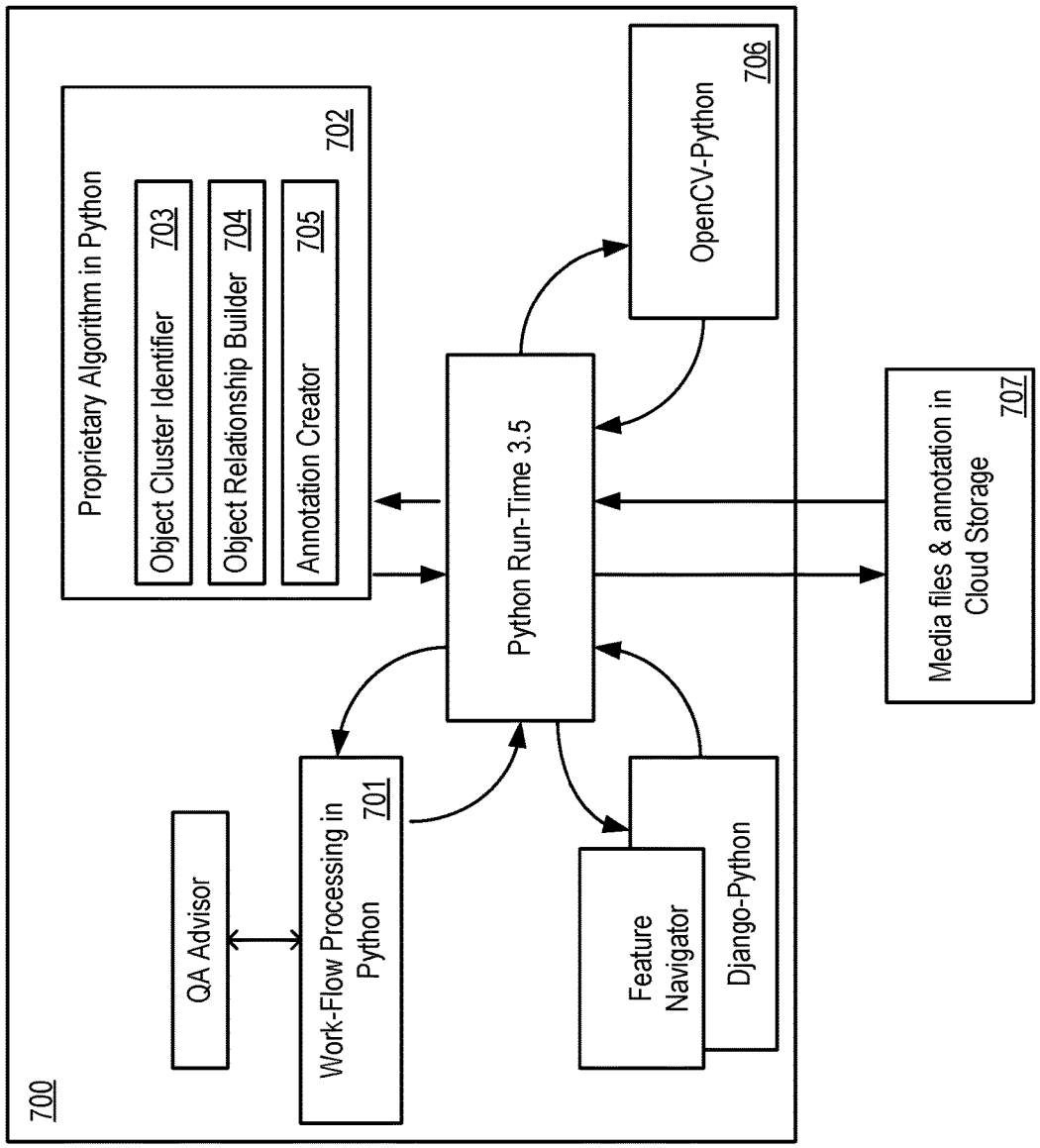
FIG. 7 shows an example of block diagram focusing on annotation according to some embodiments.

FIG. 7 shows an exemplary architecture 700 according to some embodiments. Architecture 700 focuses on the annotation operation. As described in more detail below, in some embodiments, the annotation step includes generating metadata for the first segment, wherein the metadata for the first segment comprises one or more of (i) an advertiser associated with the first segment, (ii) a date or date range associated with the first segment, (iii) an identification of one or more objects within the first segment, (iv) a relationship between an individual object and at least one other individual object within the first segment, (iv) pricing information associated with the first segment, (v) pricing information associated with one or more objects within the first segment, and (vi) a geographic region associated with the first segment. The annotations could include one or more additional annotations, too.

The Annotation operation resides in the work-flow block, 701, and uses the object clustering identifier, 703, offered by the proprietary algorithm, 702, block to analyze the relationships among the multimedia element objects detected during the detection operation. Fragments of text and icons or logos can be clustered or associated as a subgroup due to attributes like closeness of geographic location (i.e., their relative positions in an image or sub-portion thereof), semantic similarities, font size and type, etc. Once the objects can be clustered, trees of relationships and objects can be established using the Object Relationship Builder, 703, in the proprietary algorithm block. Then, Annotation Creator, 704, available in the proprietary algorithms block, 702, is used to export annotation information using any data format suitable to describe relationship. One example format is JSON, but other formats could be used, too.

Traditionally, annotations of an advertisement are well-defined attributes extracted to be associated with the advertisement, e.g., headline, secondary line, etc. In some embodiments, an annotation based on semantic analysis is used. As a result, not only the headline and/or secondary line messages are detected based on the font size, but also the detailed contents are all identified.

Figure 8:
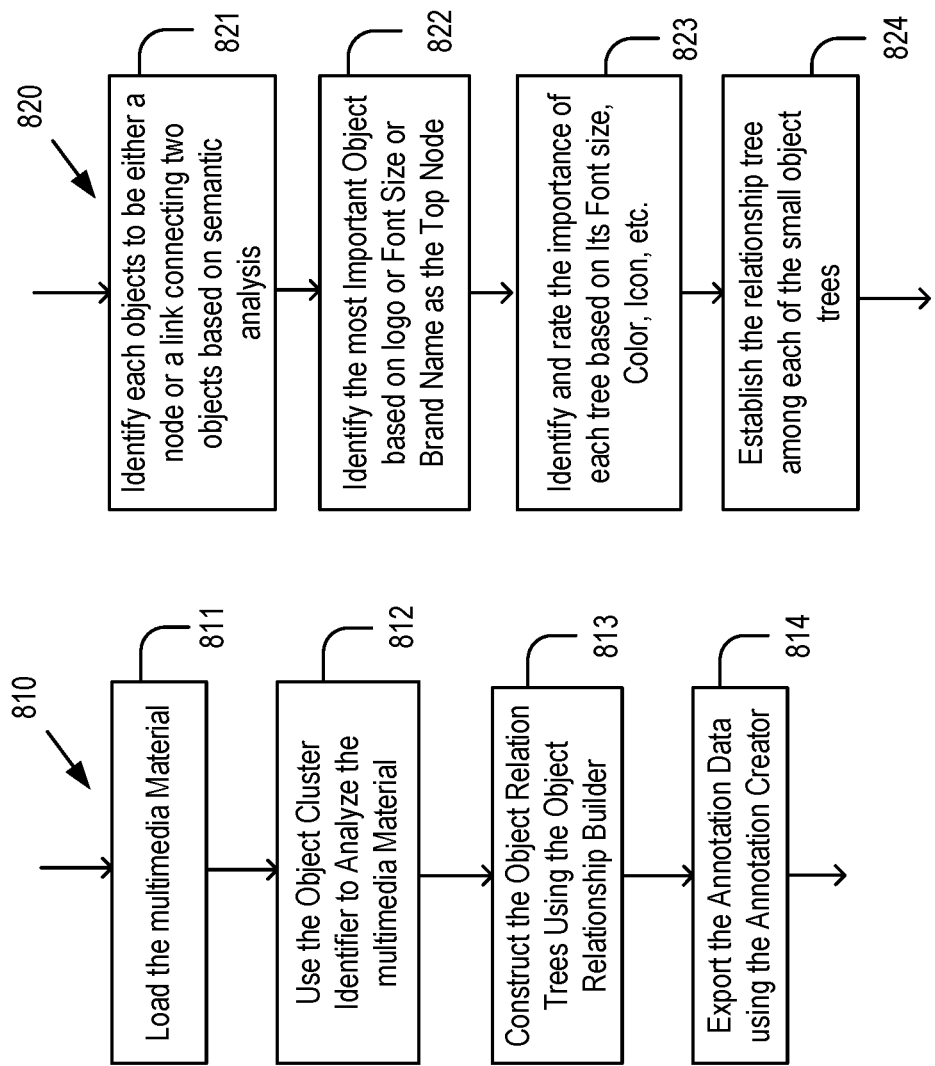
FIGS. 8A, 8B, and 8C show example flow-charts of the annotation process according to some embodiments.

FIG. 8A shows process 810 for the annotation operation according to some embodiments.

Process 810 begins at block 811, which includes loading target multimedia material for analysis to identify objects and detect attributes.

After uploading the target multimedia material, identifying objects, and detecting attributes at block 811, process 810 advances to block 812, which includes identifying clustered objects which are associated with their geographic locations.

Next, process 810 advances to block 813, which includes identifying each object to be either a node or a relationship. Details of block 813 are illustrated in FIG. 8B.

When all the objects are identified, process 810 advances to block 814, which includes exporting the relationship tree to the cloud storage as the annotation.

FIG. 8B shows subroutine 820, which implements the functions block 813 of FIG. 8A. In some embodiments, subroutine 820 includes generating the relationship tree and subtrees of an advertisement.

Subroutine 820 begins at block 821, which includes identifying whether an object is a node or a relationship. For example, as shown in FIG. 8C, an SUV icon is a node, a piece of text like "CR-V" is a node; the text next to number 168 of "leasing price" represents a relationship while the text next to 258 which represents "purchase price" is also a relationship.

Next, subroutine 820 advances to block 822, which includes extracting the headline message and the brand-name based on the font size and the location of the texts.

Next, subroutine 820 advances to block 823, which include identifying the importance of information associated with that particular cluster according to the font size. In this case, the text "CR-V" and numbers 168 and 258 in FIG. 8(*c*) are the major information in the cluster of objects.

Once the attributes of a cluster are identified and classified in block 823, subroutine 820 advances to block 824, which includes identifying the relationship among the clusters and to the entire advertisement and associating the advertisement with the headline and brand-name.

Figure 9:
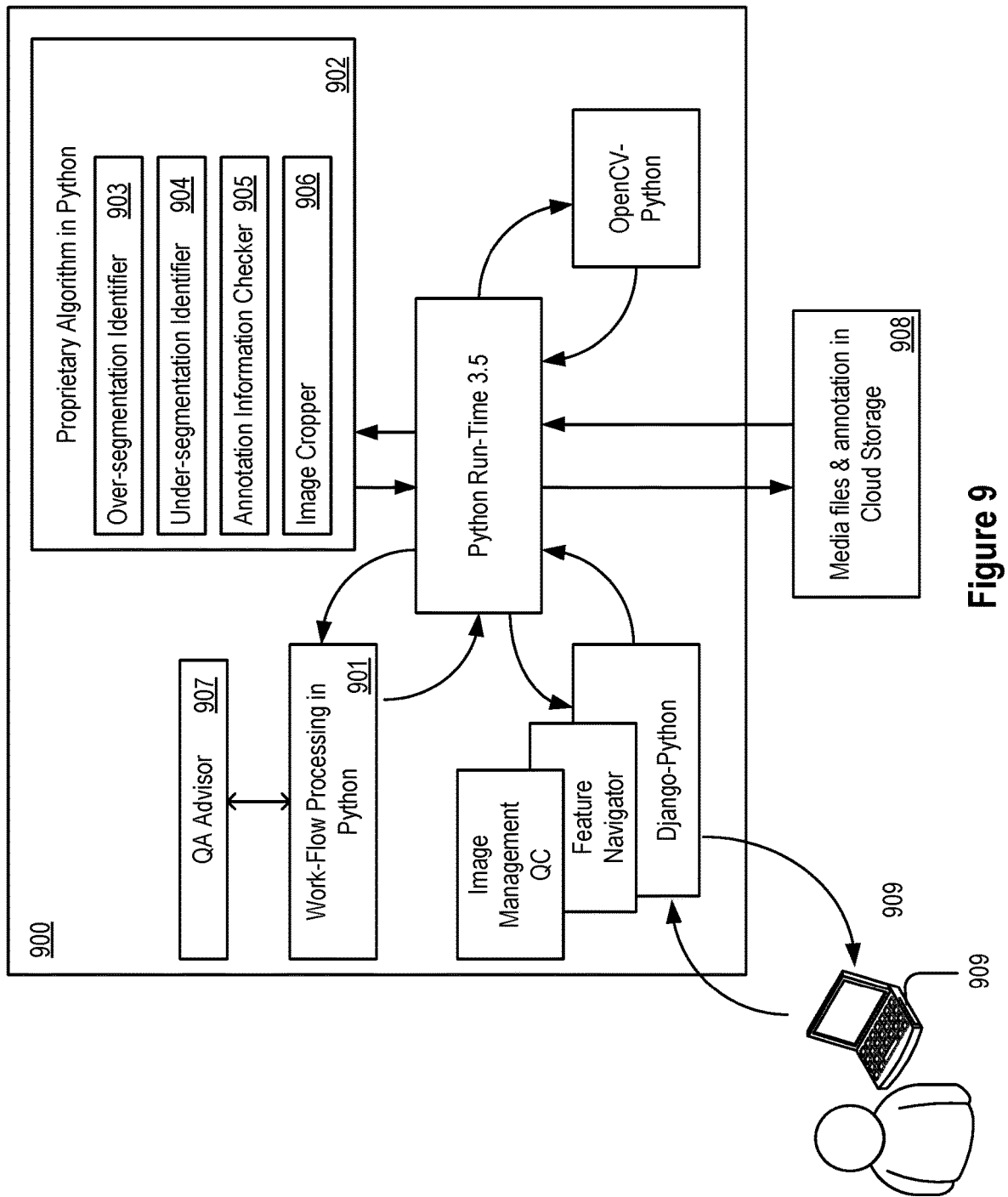
FIG. 9 shows an example of block diagram focusing on Quality Assurance (QA) Process according to some embodiments.

FIG. 9 shows architecture 900, focusing on the Quality Assurance (QA) operation in the work-flow, 901. As described in more detail herein, in some embodiments, the quality assurance operation includes analyzing one or more of the first segment and annotations of the first segment, and flagging one or more of the first segment and the annotations for human review. In some embodiments, analyzing one or more of the first segment and the annotations, and flagging one or more of the first segment and the annotations for human review comprises one or more of: (1) determining whether the first segment is likely over segmented or under segmented, and in response to determining that the first segment is likely either over segmented or under segmented, flagging the first segment for human review; (2) determining whether a text element within the first segment was likely detected inaccurately, and in response to determining that the text element within the first segment was likely detected inaccurately, flagging the text element for human review; and (2) determining whether an image element within the first segment was likely detected inaccurately, and in response to determining that the image element within the first segment was likely detected inaccurately, flagging the image element for human review.

In some embodiments, the QA operation uses functions available from the proprietary algorithm block, 902, to identify over-segmentation and under-segmentation conditions. This is achieved by using the functions of over-segment identifier, 903, and under-segment identifier, 904, offered by the proprietary algorithm block, 901. When the conditions are observed, a warning is flagged and corrective actions are taken. In case of over-segmentation, multiple fragments with close semantic relationship are merged; thus, the corners of the new rectangle area are identified as a result. The image cropping tool, 906, is used to obtain a new merged self-contained multimedia material automatically. In case of under-segmentation, the new area can be cropped by an operator using the cropping tool from the proprietary algorithms block via the user interface. Further, the QA operation uses the Annotation Information Checker, 905, to scan through all the objects for their detected attributes and their positions in their corresponding annotation relationship tree. The checker flags missing information as part of the metadata.

Figure 10:
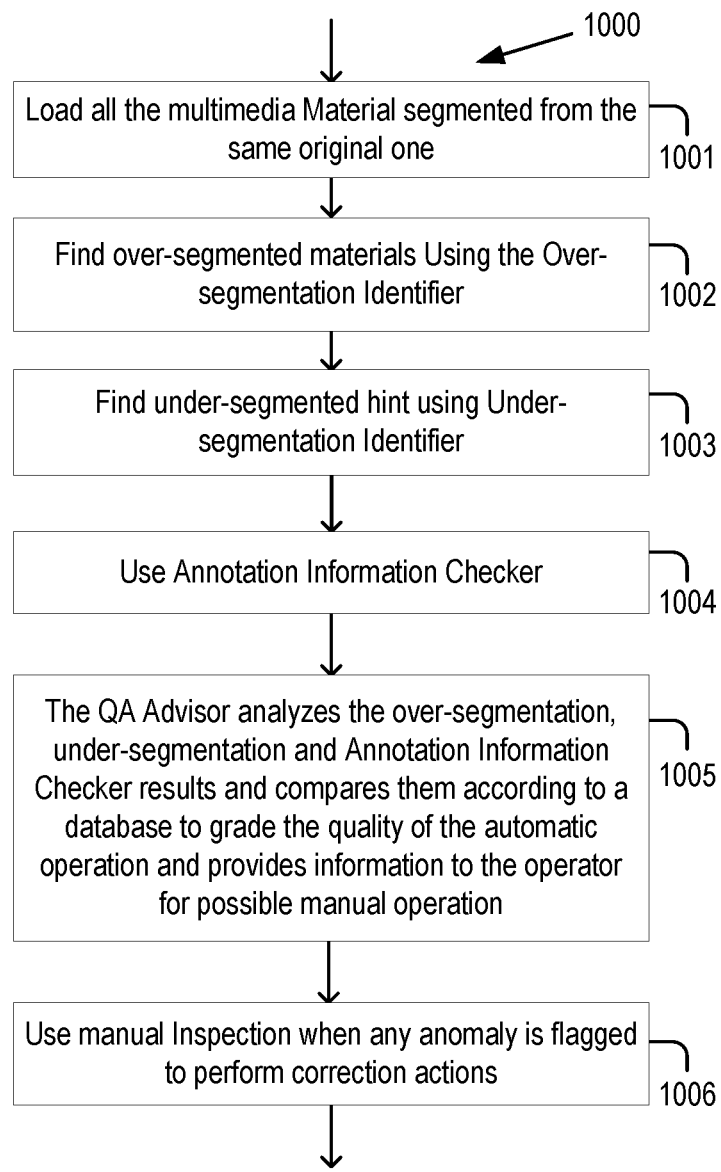
FIG. 10 shows an example flow-chart of the QA Process according to some embodiments.

FIG. 10 shows process 1000 for implementing one or more aspects of the QA operation in the work-flow.

Process 1000 begins at block 1001, which includes loading all the fragmented materials which originated from the same original multimedia material for analysis.

Figure 11:
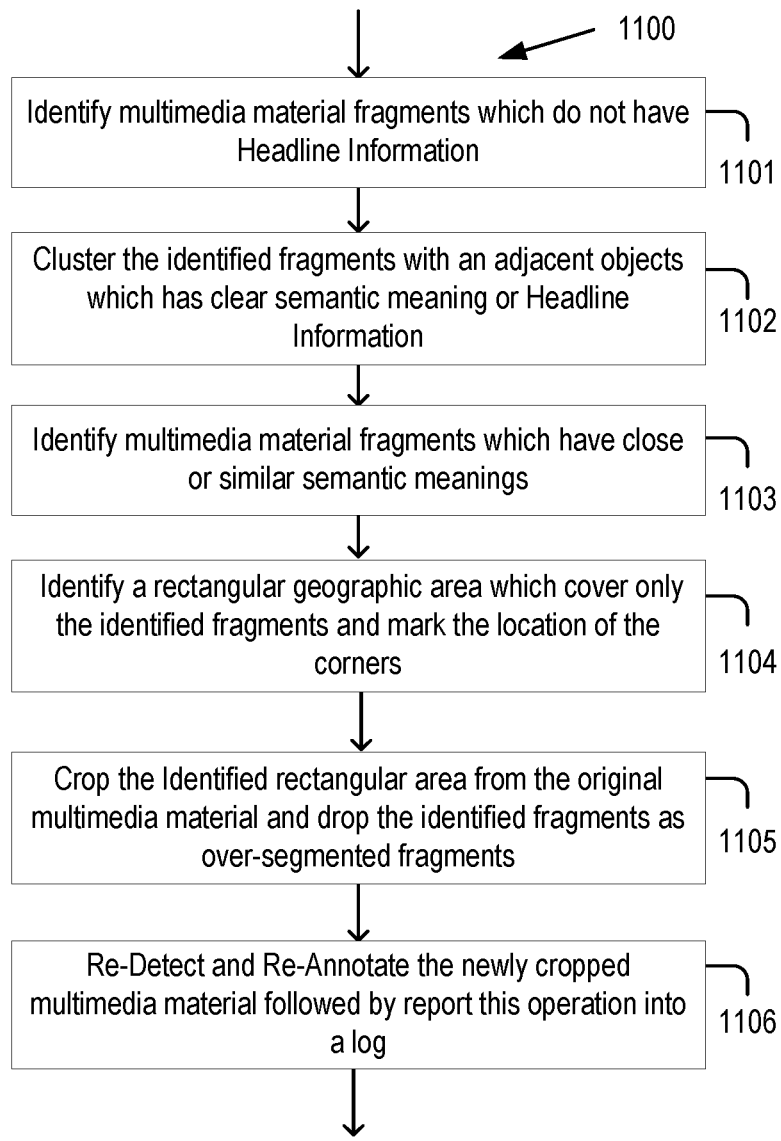
FIG. 11 shows the flow-chart of recombination of fragments of over-segmented images according to some embodiments.

Next, process 100 advances to block 1002, which includes identifying the related over-segmented fragments using the over-segmentation identifier whose detailed procedure is described in FIG. 11. In some embodiments, the correction for over-segmentation is performed automatically. In some embodiments, the correction for over-segmentation is performed manually. In further embodiments, the correction for over-segmentation is performed partially automatically and partially manually.

Next, process 1000 advances to block 1003, which includes using the under-segmentation identifier to identify the likelihood and the reasons of under-segmentation. This is done by identifying a cluster of objects organized with a relationship tree of distinctive semantic meaning among other object relationship trees within a multimedia material.

Next, process 1000 advances to block 1004, which includes further checking the integrity of each object relationship tree to find incomplete information or anomalies.

Next, process 1000 advances to block 1005, which includes further analyzing the results of the QA procedure. In some embodiments, block 1005 utilizes QA Advisor, 907, in FIG. 9 to analyze the results from over-segmentation identifier, under-segmentation identifier and the annotation information checker. For example, due to the low-quality image like the one in FIG. 8(*c*), there may be text information that cannot be extracted correctly. In such a scenario, QA Advisor flags the incomplete information and requests the operator to import the missing information manually. The QA Advisor reports the result of the under-segmentation identifier and marks up the potential objects which could be grouped to be further segmented into an independent fragment. Further, the QA Advisor records any icons, logos or other images that were not identified by the proprietary cloud service in 503 of FIG. 5. This icon or image can be stored and manually annotated to become part of new training data for use in updating the machine learning function of the proprietary service 503 in the cloud. For example, a new version of headline text can be discovered by searching and matching with an item existing in the database of a particular product. In some embodiment, the QA Advisor function is configured to implement one or both of: (i) a rule-based engine configured to apply rules to at least segments and annotations, wherein rules are devised by a human operator based on prior experiences in segmenting and annotating multimedia-based advertisement materials; and (ii) a neural-network based classification engine trained to identify improperly and properly segmented multimedia-based advertisement materials based on a training set of multimedia-based advertisement material that has been tagged by a human operator.

In some embodiments, process 1000 advances to block 1006, which includes a user manually inspecting anomalies that the QA Advisor previously identified and performing any further corrective actions that may be required or at least desired.

FIG. 11 shows example process 1100 for automatically identifying and combining over-segmented multimedia materials into a single self-contained multimedia item.

Process 1100 begins at block 1101, which includes identifying fragments with limited semantic meaning, such as for example, a fragment without text or a fragment without brand-name and supporting text associated in its object relationship tree.

Next, process 1100 advances to block 1102, which includes clustering those identified fragments from block 1101 with geographically close relationship.

Next, process 1100 advances to block 1102, which includes further identifying a fragment within the proximity of the clustered fragments with a clear headline information or brand-name without other semantic supporting information.

Next, process 1100 advances to block 1103, which includes further identifying and marking fragments with object relationship tree of similar semantic meaning with other fragments.

Next, process 1100 advances to block 1104, which includes identifying the location(s) of the marked fragments and identifying a rectangular area which cover only those identified fragments, and then obtaining the coordinates of the four corners.

Next, process 1100 advances to block 1105, which includes using the identified corners determined in block 1104 to crop out one or more fragments from the original multimedia material.

Next, process 1100 advances to block 1106, which includes re-detecting the objects and re-annotating the cropped fragment(s) using one or both of cloud service 503 and cloud service 504 in FIG. 5.

Figure 12:
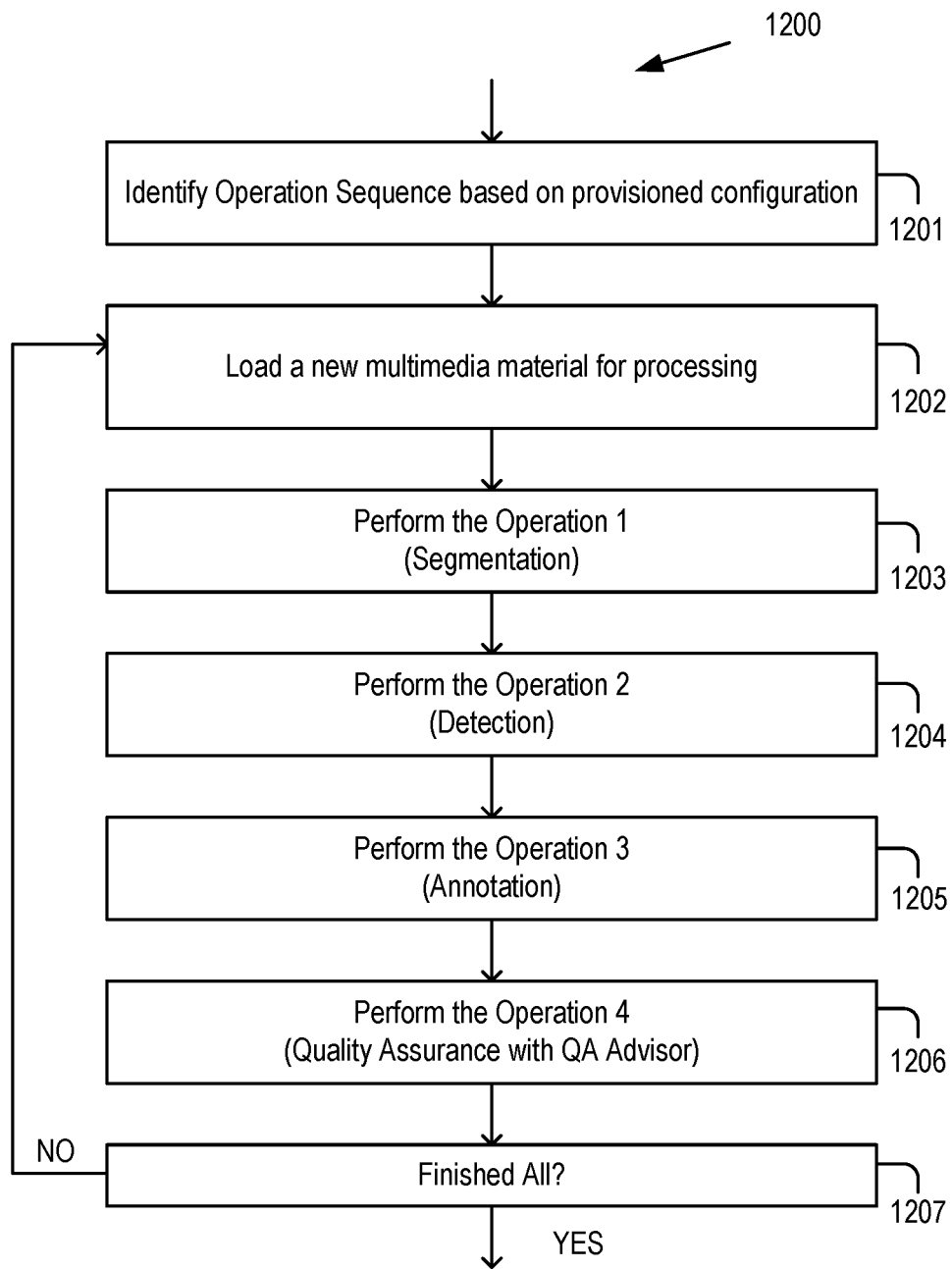
FIG. 12 shows the work-flow flow-chart according to some embodiments.

FIG. 12 shows example process 1200 for implementing some aspects of the work-flow block 102 of FIG. 1.

Figure 13:
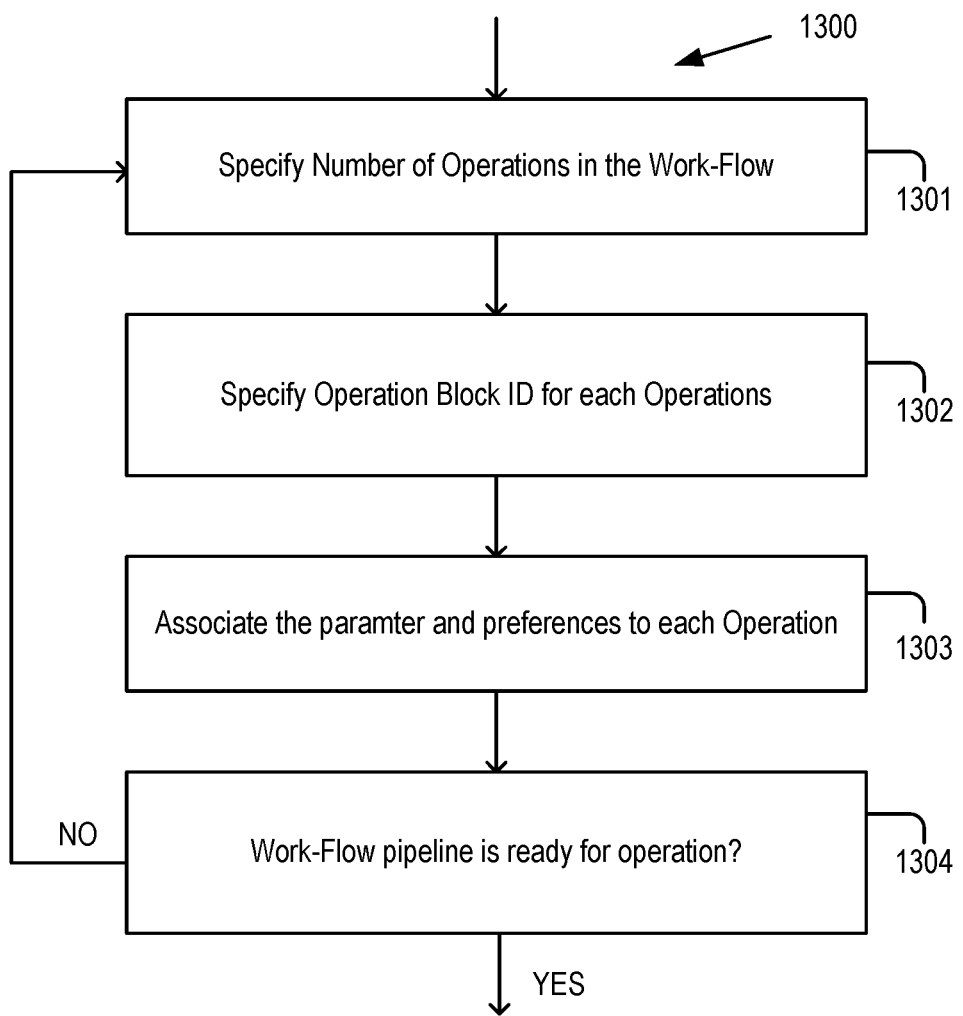
FIG. 13 shows the work-flow administration and management flow-chart according to some embodiments.

Process 1200 begins at block 1201, which includes configuring the work-flow block, 102, using information created by procedure 1300 in FIG. 13.

Next, process 1200 advances to block 1202 which includes uploading the targeted multimedia material to be processed from the cloud storage 103. Then, functions in blocks 1203, 1204, 1205, 1206 are performed in sequence.

One embodiment of this sequence is shown in FIG. 12 with extraction and segmentation operation in block 1203, detection operation in block 1204, annotation operation in block 1205, and Quality Assurance (QA) operation in block 1206. If needed, additional operations can be scheduled using the process described in 1300 before block 1207 is performed. Block 1207 includes checking whether all the targeted multimedia materials have been processed.

FIG. 13 shows example process 1300 for implementing some aspects of the work-flow management setup procedure.

Process 1300 begins at block 1301, which includes defining the number of operations to be performed by the work flow.

Next, process 1300 advances to block 1302, which includes specifying what operation each block will perform. In example process 1200 shown in FIG. 12, there are 4 operations to be configured. The first operation is Segmentation, the second is Detection, the third is Annotation and the fourth is QA.

Next, process 1300 advances to block 1303, which includes setting parameters on the limits of the segmentation and detection functions to be performed. For example, setting the parameters on the limits of the segmentation and detection functions includes, in some embodiments, setting the minimum height(s) and width(s) of a fragment to be segmented, setting the minimum number of objects, setting the minimum length of text to be extracted, and/or setting the minimum height of the object relationship tree to be identified, etc. In some embodiments, block 1303 also includes specifying which particular product categories this operation is looking for. For example, choices of automobile, real-estate, and cosmetic products, etc. are specified. This information can be used to choose the preferred detection operation from cloud services.

What is claimed is:

1. A system comprising:
one or more processors; and
tangible, non-transitory computer-readable media having instructions stored therein, wherein the instructions, when executed by the one or more processors, cause the system to perform a method comprising:
receiving multimedia material for analysis, wherein the multimedia material comprises at least one of print media, television, internet text, internet images, and internet video;
extracting one or more elements from the multimedia material and forming one or more objects comprising the elements based at least in part on one or both of a location and a size of the individual elements;
segmenting the multimedia material into one or more segments, where an individual segment of the multimedia material comprises two or more objects located within a threshold distance from each other;
detecting one or more objects within at least a first segment;
associating attributes with the detected one or more objects within at least the first segment;

annotating the first segment comprising the two or more objects by creating a relationship tree among the two or more objects in the first segment; and storing annotations of the first segment for analysis.

2. The system of claim 1, wherein extracting one or more elements from the multimedia material and forming one or more objects comprising the elements based at least in part on one or both of a location and a size of the individual elements comprises:

identifying an individual element within the multimedia material;

determining a location and a size of the individual element within the multimedia material; and inferring at least one relationship between the individual element and at least one other element based at least in part on a distance between the individual element and the at least one other element.

3. The system of claim 1, wherein segmenting the multimedia material into one or more segments comprises:

generating a plurality of segments formed by a grid of horizontal strips and vertical strips in the multimedia material, wherein at least one vertical strip is located between at least two objects, and wherein at least one horizontal strip is located between at least two objects.

4. The system of claim 1, wherein detecting one or more objects within at least the first segment comprises:

providing the first segment as an argument to at least one machine learning classifier; and receiving a classification of the first segment with one or more confidence levels from the at least one machine learning classifier, wherein the classification comprises one or more of (i) an identification of an object in the first segment with a corresponding confidence level of the identification, and (ii) an indication of whether the first segment is or is not an advertisement with a corresponding confidence level of whether the first segment is or is not an advertisement.

5. The system of claim 1, wherein detecting one or more objects within at least the first segment comprises:

providing the first segment as an argument to a first machine learning classifier;

receiving a first classification of the first segment with one or more confidence levels from the first machine learning classifier, wherein the first classification comprises one or more of (i) a first identification of an object in the first segment with a corresponding first confidence level of the first identification, and (ii) a first indication of whether the first segment is or is not an advertisement with a corresponding first confidence level of whether the first segment is or is not an advertisement;

providing the first segment as an argument to a second machine learning classifier;

receiving a second classification of the first segment with one or more confidence levels from the second machine learning classifier, wherein the second classification comprises one or more of (i) a second identification of the object in the first segment with a corresponding second confidence level of the first identification, and (ii) a second indication of whether the first segment is or is not an advertisement with a corresponding second confidence level of whether the first segment is or is not an advertisement;

weighting one or more components of the first classification and the second classification based on historical accuracy of prior classifications from the first machine learning classifier and the second machine learning classifier; and based on the weighting, determining one or more of (i) an identification of an object in the first segment and (ii) whether or not the first segment is an advertisement.

6. The system of claim 1, wherein annotating the first segment comprises:

generating metadata for the first segment, wherein the metadata for the first segment comprises one or more of (i) an advertiser associated with the first segment, (ii) a date or date range associated with the first segment, (iii) an identification of one or more objects within the first segment, (iv) a relationship between an individual object and at least one other individual object within the first segment, (iv) pricing information associated with the first segment, (v) pricing information associated with one or more objects within the first segment, and (vi) a geographic region associated with the first segment.

7. The system of claim 1, wherein the method further comprises:

analyzing one or more of the first segment and annotations of the first segment, and flagging one or more of the first segment and the annotations for human review.

8. The system of claim 7, wherein analyzing one or more of the first segment and the annotations, and flagging one or more of the first segment and the annotations for human review comprises one or more of: (i) determining whether the first segment is likely over segmented or under segmented, and in response to determining that the first segment is likely either over segmented or under segmented, flagging the first segment for human review; (ii) determining whether a text element within the first segment was likely detected inaccurately, and in response to determining that the text element within the first segment was likely detected inaccurately, flagging the text element for human review; and (iii) determining whether an image element within the first segment was likely detected inaccurately, and in response to determining that the image element within the first segment was likely detected inaccurately, flagging the image element for human review.

9. The system of claim 7, wherein analyzing one or more of the first segment and annotations of the first segment, and flagging one or more of the first segment and the annotations for human review is performed at least in part via an Artificial Intelligence based Advisor function configured to assist a human operator.

10. The system of claim 9, wherein the Artificial Intelligence based Advisor function is configured to implement one or both of:

(i) a rule-based engine configured to apply rules to at least segments and annotations, wherein rules are devised by a human operator based on prior experiences in segmenting and annotating multimedia-based advertisement materials; and (ii) a neural-network based classification engine trained to identify improperly and properly segmented multimedia-based advertisement materials based on a training set of multimedia-based advertisement material that has been tagged by a human operator.

11. A method comprising:

receiving multimedia material for analysis, wherein the multimedia material comprises at least one of print media, television, internet text, internet images, and internet video;

extracting one or more elements from the multimedia material and forming one or more objects comprising the elements based at least in part on one or both of a location and a size of the individual elements;

segmenting the multimedia material into one or more segments, where an individual segment of the multimedia material comprises two or more objects located within a threshold distance from each other;

detecting one or more objects within at least a first segment;

associating attributes with the detected one or more objects within at least the first segment;

annotating the first segment comprising the two or more objects by creating a relationship tree among the two or more objects in the first segment; and storing annotations of the first segment for analysis.

12. The method of claim 11, wherein extracting one or more elements from the multimedia material and forming one or more objects comprising the elements based at least in part on one or both of a location and a size of the individual elements comprises:

identifying an individual element within the multimedia material;

determining a location and a size of the individual element within the multimedia material; and inferring at least one relationship between the individual element and at least one other element based at least in part on a distance between the individual element and the at least one other element.

13. The method of claim 11, wherein segmenting the multimedia material into one or more segments comprises:

generating a plurality of segments formed by a grid of horizontal strips and vertical strips in the multimedia material, wherein at least one vertical strip is located between at least two objects, and wherein at least one horizontal strip is located between at least two objects.

14. The method of claim 11, wherein detecting one or more objects within at least the first segment comprises:

providing the first segment as an argument to at least one machine learning classifier; and receiving a classification of the first segment with one or more confidence levels from the at least one machine learning classifier, wherein the classification comprises one or more of (i) an identification of an object in the first segment with a corresponding confidence level of the identification, and (ii) an indication of whether the first segment is or is not an advertisement with a corresponding confidence level of whether the first segment is or is not an advertisement.

15. The method of claim 11, wherein detecting one or more objects within at least the first segment comprises:

providing the first segment as an argument to a first machine learning classifier;

receiving a first classification of the first segment with one or more confidence levels from the first machine learning classifier, wherein the first classification comprises one or more of (i) a first identification of an object in the first segment with a corresponding first confidence level of the first identification, and (ii) a first indication of whether the first segment is or is not an advertisement with a corresponding first confidence level of whether the first segment is or is not an advertisement;

providing the first segment as an argument to a second machine learning classifier;

receiving a second classification of the first segment with one or more confidence levels from the second machine learning classifier, wherein the second classification comprises one or more of (i) a second identification of the object in the first segment with a corresponding second confidence level of the first identification, and (ii) a second indication of whether the first segment is or is not an advertisement with a corresponding second confidence level of whether the first segment is or is not an advertisement;

weighting one or more components of the first classification and the second classification based on historical accuracy of prior classifications from the first machine learning classifier and the second machine learning classifier; and based on the weighting, determining one or more of (i) an identification of an object in the first segment and (ii) whether or not the first segment is an advertisement.

16. The method of claim 11, wherein annotating the first segment comprises:

generating metadata for the first segment, wherein the metadata for the first segment comprises one or more of (i) an advertiser associated with the first segment, (ii) a date or date range associated with the first segment, (iii) an identification of one or more objects within the first segment, (iv) a relationship between an individual object and at least one other individual object within the first segment, (iv) pricing information associated with the first segment, (v) pricing information associated with one or more objects within the first segment, and (vi) a geographic region associated with the first segment.

17. The method of claim 11, wherein the method further comprises:

analyzing one or more of the first segment and annotations of the first segment, and flagging one or more of the first segment and the annotations for human review.

18. The method of claim 17, wherein analyzing one or more of the first segment and the annotations, and flagging one or more of the first segment and the annotations for human review comprises one or more of: (i) determining whether the first segment is likely over segmented or under segmented, and in response to determining that the first segment is likely either over segmented or under segmented, flagging the first segment for human review; (ii) determining whether a text element within the first segment was likely detected inaccurately, and in response to determining that the text element within the first segment was likely detected inaccurately, flagging the text element for human review; and (iii) determining whether an image element within the first segment was likely detected inaccurately, and in response to determining that the image element within the first segment was likely detected inaccurately, flagging the image element for human review.

19. The method of claim 17, wherein analyzing one or more of the first segment and annotations of the first segment, and flagging one or more of the first segment and the annotations for human review is performed at least in part via an Artificial Intelligence based Advisor function configured to assist a human operator.

20. The method of claim 19, wherein the Artificial Intelligence based Advisor function is configured to implement one or both of:

(i) a rule-based engine configured to apply rules to at least segments and annotations, wherein rules are devised by a human operator based on prior experiences in segmenting and annotating multimedia-based advertisement materials; and (ii) a neural-network based classification engine trained to identify improperly and properly segmented multimedia-based advertisement materials based on a training set of multimedia-based advertisement material that has been tagged by a human operator.

* * * * *